(12) United States Patent
Atsmon et al.

(10) Patent No.: US 7,941,480 B2
(45) Date of Patent: May 10, 2011

(54) COMPUTER COMMUNICATIONS USING ACOUSTIC SIGNALS

(75) Inventors: Alon Atsmon, Yahud (IL); Amit Antebi, Ramat-Gan (IL); Nathan Altman, RaAnana (IL); Zvi Lev, Tel-Aviv (IL); Moshe Cohen, Tel-Aviv (IL)

(73) Assignee: BeepCard Inc., Santa Monica, CA (US)

( * ) Notice: Subject to any disclaimer, the term of this patent is extended or adjusted under 35 U.S.C. 154(b) by 0 days.

(21) Appl. No.: 12/272,828

(22) Filed: Nov. 18, 2008

(65) Prior Publication Data

US 2009/0067291 A1    Mar. 12, 2009

Related U.S. Application Data

(60) Division of application No. 11/339,275, filed on Jan. 25, 2006, now Pat. No. 7,480,692, which is a division of application No. 09/806,618, filed as application No. PCT/IL99/00521 on Oct. 1, 1999, now Pat. No. 7,383,297, and a continuation-in-part of application No. PCT/IL99/00470, filed on Aug. 27, 1999, and a continuation-in-part of application No. PCT/IL99/00506, filed on Sep. 16, 1999.

(60) Provisional application No. 60/115,231, filed on Jan. 8, 1999, provisional application No. 60/122,687, filed on Mar. 3, 1999, provisional application No. 60/143,220, filed on Jul. 9, 1999, provisional application No. 60/145,342, filed on Jul. 23, 1999, provisional application No. 60/153,858, filed on Sep. 14, 1999.

(30) Foreign Application Priority Data

Oct. 2, 1998 (IL) .......................................... 126444
Nov. 16, 1998 (IL) .......................................... 127072
Dec. 14, 1998 (IL) .......................................... 127569

(51) Int. Cl.
*G06F 15/16* (2006.01)

(52) U.S. Cl. ...... 709/202; 709/203; 709/217; 704/200.1

(58) Field of Classification Search .......... 709/201–204, 709/217–219; 704/200, 200.1, 201
See application file for complete search history.

(56) References Cited

U.S. PATENT DOCUMENTS 2,990,646 A    7/1961   Berger
(Continued)

FOREIGN PATENT DOCUMENTS

DE           19645071          5/1998
(Continued)

OTHER PUBLICATIONS

International Preliminary Examination Report Dated Dec. 4, 2003 From the International Preliminary Examining Authority of The Patent Cooperation Authority Re.: Application No. PCT/IL01/00758.

(Continued)

*Primary Examiner* — Bharat N Barot

(57) ABSTRACT

A method of communicating with an electronic device. The method includes providing an electronic device having an audible sound receiving and generating sub-system including a microphone, transmitting from a source at least one acoustic signal encoded with information, receiving said at least one acoustic signal by said microphone and determining a spatial position, distance or movement of the microphone relative to the source, responsive to the received at least one signal.

23 Claims, 4 Drawing Sheets

U.S. PATENT DOCUMENTS

| | | | |
|---|---|---|---|
| 3,961,323 | A | 6/1976 | Hartkorn |
| 4,207,696 | A | 6/1980 | Hyman et al. |
| 4,231,184 | A | 11/1980 | Corris et al. |
| 4,264,978 | A | 4/1981 | Whidden |
| 4,353,064 | A | 10/1982 | Stamm |
| 4,390,877 | A | 6/1983 | Curran |
| 4,479,995 | A | 10/1984 | Suzuki et al. |
| 4,614,861 | A | 9/1986 | Pavlov et al. |
| 4,637,007 | A | 1/1987 | Sakurai |
| 4,640,034 | A | 2/1987 | Zisholtz |
| 4,641,374 | A | 2/1987 | Oyama |
| 4,670,746 | A | 6/1987 | Taniguchi et al. |
| 4,673,371 | A | 6/1987 | Furukawa |
| 4,677,657 | A | 6/1987 | Nagata et al. |
| 4,682,370 | A | 7/1987 | Matthews |
| 4,696,653 | A | 9/1987 | McKeefery |
| 4,716,376 | A | 12/1987 | Daudelin |
| 4,717,364 | A | 1/1988 | Furukawa |
| 4,766,294 | A | 8/1988 | Nara et al. |
| 4,814,591 | A | 3/1989 | Nara et al. |
| 4,818,855 | A | 4/1989 | Mongeon et al. |
| 4,840,602 | A | 6/1989 | Rose |
| 4,851,654 | A | 7/1989 | Nitta |
| 4,857,030 | A | 8/1989 | Rose |
| 4,874,935 | A | 10/1989 | Younger |
| 4,894,663 | A | 1/1990 | Urbish et al. |
| 4,918,416 | A | 4/1990 | Walton et al. |
| 4,924,075 | A | 5/1990 | Tanaka |
| 4,935,907 | A | 6/1990 | Friedman |
| 4,942,534 | A | 7/1990 | Yokoyama et al. |
| 4,961,229 | A | 10/1990 | Takahashi |
| 4,973,286 | A | 11/1990 | Davison |
| 4,978,840 | A | 12/1990 | Anegawa |
| 4,984,380 | A | 1/1991 | Anderson |
| 5,032,099 | A | 7/1991 | Chan |
| 5,072,103 | A | 12/1991 | Nara |
| 5,085,610 | A | 2/1992 | Engel et al. |
| 5,176,560 | A | 1/1993 | Wetherell et al. |
| 5,191,615 | A | 3/1993 | Aldava et al. |
| 5,209,695 | A | 5/1993 | Rothschild |
| 5,241,160 | A | 8/1993 | Bashan et al. |
| 5,280,267 | A | 1/1994 | Reggiani |
| 5,280,527 | A | 1/1994 | Gullman et al. |
| 5,289,273 | A | 2/1994 | Lang |
| 5,307,051 | A | 4/1994 | Seldmayr |
| 5,314,336 | A | 5/1994 | Diamond et al. |
| 5,317,636 | A | 5/1994 | Vizcaino |
| 5,324,038 | A | 6/1994 | Sasser |
| 5,356,326 | A | 10/1994 | Ting |
| 5,376,778 | A | 12/1994 | Kreft |
| 5,407,376 | A | 4/1995 | Avital et al. |
| 5,416,829 | A | 5/1995 | Umemoto |
| 5,420,606 | A | 5/1995 | Begum et al. |
| 5,423,073 | A | 6/1995 | Ogawa |
| 5,434,398 | A | 7/1995 | Goldberg |
| H1469 | H | 8/1995 | Simonoff |
| 5,452,901 | A | 9/1995 | Nakada et al. |
| 5,467,095 | A | 11/1995 | Rodal et al. |
| 5,479,408 | A | 12/1995 | Will |
| 5,511,122 | A | 4/1996 | Atkinson |
| 5,517,194 | A | 5/1996 | Carroll et al. |
| 5,522,089 | A | 5/1996 | Kikinis et al. |
| 5,523,749 | A | 6/1996 | Cole et al. |
| 5,539,819 | A | 7/1996 | Sonoyama et al. |
| 5,552,790 | A | 9/1996 | Gunnarsson |
| 5,579,537 | A | 11/1996 | Takahisa |
| 5,583,933 | A | 12/1996 | Mark |
| 5,606,732 | A | 2/1997 | Vignone, Sr. |
| 5,623,552 | A | 4/1997 | Lane |
| 5,629,867 | A | 5/1997 | Goldman |
| 5,629,981 | A | 5/1997 | Nerlikar |
| 5,635,701 | A | 6/1997 | Gloton |
| 5,638,047 | A * | 6/1997 | Orloff et al. ............. 340/539.16 |
| 5,638,450 | A | 6/1997 | Robson |
| 5,640,003 | A | 6/1997 | Makino |
| 5,646,907 | A | 7/1997 | Maccabee |
| 5,647,787 | A | 7/1997 | Raviv et al. |
| 5,655,945 | A | 8/1997 | Jani |
| 5,697,829 | A | 12/1997 | Chainani et al. |
| 5,698,836 | A | 12/1997 | Fujioka |
| 5,708,853 | A | 1/1998 | Sanemitsu |
| 5,717,168 | A | 2/1998 | Debuisser et al. |
| 5,719,387 | A | 2/1998 | Fujioka |
| 5,731,757 | A | 3/1998 | Layson, Jr. |
| 5,740,232 | A | 4/1998 | Pailles et al. |
| 5,742,677 | A | 4/1998 | Pinder et al. |
| 5,745,555 | A | 4/1998 | Mark |
| 5,745,591 | A | 4/1998 | Feldman |
| 5,752,880 | A | 5/1998 | Gabai et al. |
| 5,761,606 | A | 6/1998 | Wolzien |
| 5,764,512 | A | 6/1998 | Michel et al. |
| 5,764,763 | A | 6/1998 | Jensen et al. |
| 5,764,900 | A * | 6/1998 | Morris et al. ................. 709/203 |
| 5,774,791 | A | 6/1998 | Strohallen et al. |
| 5,778,071 | A | 7/1998 | Caputo et al. |
| 5,778,187 | A | 7/1998 | Monteiro et al. |
| 5,786,764 | A | 7/1998 | Engellenner |
| 5,786,988 | A | 7/1998 | Harari |
| 5,789,733 | A | 8/1998 | Jachimowicz et al. |
| 5,793,305 | A | 8/1998 | Turner et al. |
| 5,800,243 | A | 9/1998 | Berman |
| 5,805,676 | A | 9/1998 | Martino |
| 5,809,245 | A | 9/1998 | Zenda |
| 5,815,020 | A | 9/1998 | Allen et al. |
| 5,818,030 | A | 10/1998 | Reyes |
| 5,825,871 | A | 10/1998 | Mark |
| 5,831,520 | A | 11/1998 | Stephan |
| 5,832,424 | A * | 11/1998 | Tsutsui ...................... 704/200.1 |
| 5,847,662 | A | 12/1998 | Yokota et al. |
| 5,847,752 | A | 12/1998 | Sebestyen |
| 5,850,077 | A | 12/1998 | Tognazzini |
| 5,854,589 | A | 12/1998 | How et al. |
| 5,859,913 | A | 1/1999 | Goreta et al. |
| 5,861,841 | A | 1/1999 | Gildea et al. |
| 5,862,491 | A | 1/1999 | Nair et al. |
| 5,864,794 | A | 1/1999 | Tasaki |
| 5,870,155 | A | 2/1999 | Erlin |
| 5,878,142 | A | 3/1999 | Caputo et al. |
| 5,880,769 | A | 3/1999 | Nemirofsky et al. |
| 5,881,149 | A | 3/1999 | Weatherill |
| 5,884,271 | A | 3/1999 | Pitroda |
| 5,903,721 | A | 5/1999 | Sixtus |
| 5,905,865 | A | 5/1999 | Palmer et al. |
| 5,907,142 | A | 5/1999 | Kelsey |
| 5,914,980 | A | 6/1999 | Yokota et al. |
| 5,921,674 | A | 7/1999 | Koczi |
| 5,928,292 | A | 7/1999 | Miller et al. |
| 5,949,772 | A | 9/1999 | Sugikawa et al. |
| 5,955,961 | A | 9/1999 | Wallerstein |
| 5,963,643 | A | 10/1999 | Goreta et al. |
| 5,986,562 | A | 11/1999 | Nikolich |
| 5,987,509 | A | 11/1999 | Portuesi |
| 6,005,548 | A * | 12/1999 | Latypov et al. ............... 345/156 |
| 6,010,074 | A | 1/2000 | Kelly et al. |
| 6,014,083 | A | 1/2000 | Bauerschmidt et al. |
| 6,016,476 | A | 1/2000 | Maes et al. |
| 6,018,641 | A | 1/2000 | Tsubouchi et al. |
| 6,019,285 | A | 2/2000 | Isobe et al. |
| 6,021,119 | A | 2/2000 | Derks et al. |
| 6,023,509 | A | 2/2000 | Herbert et al. |
| 6,023,779 | A | 2/2000 | Fullam et al. |
| 6,036,099 | A | 3/2000 | Leighton |
| 6,055,592 | A | 4/2000 | Smith |
| 6,058,373 | A | 5/2000 | Blinn et al. |
| 6,060,332 | A | 5/2000 | Martin |
| 6,068,192 | A | 5/2000 | McCabe et al. |
| 6,079,621 | A | 6/2000 | Vardanyan et al. |
| 6,081,782 | A | 6/2000 | Rabin |
| 6,089,942 | A | 7/2000 | Chan |
| 6,097,292 | A | 8/2000 | Kelly et al. |
| 6,098,106 | A | 8/2000 | Philyaw et al. |
| 6,110,000 | A | 8/2000 | Ting |
| 6,119,228 | A | 9/2000 | Angelo et al. |
| 6,125,172 | A | 9/2000 | August et al. |
| 6,125,452 | A | 9/2000 | Kuriyama |
| 6,149,490 | A | 11/2000 | Hampton et al. |
| 6,163,616 | A | 12/2000 | Feldman |

| | | |
|---|---|---|
| 6,176,837 B1 | 1/2001 | Foxlin |
| 6,182,044 B1 | 1/2001 | Fong et al. |
| 6,186,396 B1 | 2/2001 | Crandall, Jr. |
| 6,189,096 B1 | 2/2001 | Haverty |
| 6,194,993 B1 | 2/2001 | Hayashi et al. |
| 6,195,693 B1 | 2/2001 | Berry et al. |
| 6,211,858 B1 | 4/2001 | Moon et al. |
| 6,222,880 B1 | 4/2001 | Eastmond et al. |
| 6,233,736 B1 | 5/2001 | Wolzien |
| 6,236,724 B1 | 5/2001 | Labaton et al. |
| 6,237,026 B1 | 5/2001 | Prasad et al. |
| 5,763,862 A1 | 6/2001 | Jachimowicz et al. |
| 6,244,260 B1 | 6/2001 | Ragoza et al. |
| 6,248,946 B1 | 6/2001 | Dwek |
| 6,257,486 B1 | 7/2001 | Teicher et al. |
| 6,272,228 B1 | 8/2001 | Martin |
| 6,289,114 B1 | 9/2001 | Mainguet |
| 6,292,437 B1 | 9/2001 | Beard |
| 6,309,275 B1 | 10/2001 | Fong et al. |
| 6,331,972 B1 | 12/2001 | Harris et al. |
| 6,332,163 B1 | 12/2001 | Bowman-Amuah |
| 6,360,953 B1 | 3/2002 | Lin et al. |
| 6,377,670 B1 | 4/2002 | Rosset et al. |
| 6,380,844 B2 | 4/2002 | Pelekis |
| 6,382,516 B1 | 5/2002 | King |
| 6,385,314 B1 | 5/2002 | Furuya |
| 6,389,055 B1 * | 5/2002 | August et al. ............... 375/130 |
| 6,389,935 B1 | 5/2002 | Azima et al. |
| 6,392,960 B1 | 5/2002 | Seltzer et al. |
| 6,393,126 B1 | 5/2002 | Van der Kaay et al. |
| 6,400,996 B1 | 6/2002 | Hoffberg et al. |
| 6,404,877 B1 | 6/2002 | Bolduc et al. |
| 6,421,453 B1 | 7/2002 | Kanevsky et al. |
| 6,442,510 B1 | 8/2002 | Klefenz |
| 6,445,780 B1 | 9/2002 | Rosset et al. |
| 6,513,015 B2 | 1/2003 | Ogasawara |
| 6,519,564 B1 | 2/2003 | Hoffberg et al. |
| 6,547,130 B1 | 4/2003 | Shen |
| 6,556,768 B1 | 4/2003 | Nakajima et al. |
| 6,556,965 B1 | 4/2003 | Borland et al. |
| 6,559,755 B1 | 5/2003 | Hamamoto et al. |
| 6,570,490 B1 | 5/2003 | Saitoh et al. |
| 6,594,052 B2 | 7/2003 | Hiramatsu et al. |
| 6,607,136 B1 | 8/2003 | Atsmon et al. |
| 6,628,240 B2 | 9/2003 | Amadeo |
| 6,641,374 B2 | 11/2003 | Kim |
| 6,647,063 B1 | 11/2003 | Oikawa |
| 6,648,719 B2 | 11/2003 | Chan |
| 6,661,563 B2 | 12/2003 | Hayashi et al. |
| 6,681,008 B2 | 1/2004 | Bolduc et al. |
| 6,704,715 B1 | 3/2004 | Rosset et al. |
| 6,708,892 B2 | 3/2004 | Smith, II |
| 6,754,641 B2 | 6/2004 | Kolls |
| 6,758,404 B2 | 7/2004 | Ladyansky |
| 6,760,276 B1 | 7/2004 | Karr |
| 6,766,946 B2 | 7/2004 | Lida et al. |
| 6,823,452 B1 | 11/2004 | Doyle et al. |
| 6,873,974 B1 | 3/2005 | Schutzer |
| 6,934,848 B1 | 8/2005 | King et al. |
| 6,963,842 B2 | 11/2005 | Goodwin |
| 6,973,426 B1 | 12/2005 | Schier et al. |
| 6,976,164 B1 | 12/2005 | King et al. |
| 6,982,649 B2 | 1/2006 | Blum et al. |
| 6,990,334 B1 | 1/2006 | Ito |
| 7,013,301 B2 | 3/2006 | Holm et al. |
| 7,058,376 B2 | 6/2006 | Logan et al. |
| 7,080,253 B2 | 7/2006 | Weare |
| 7,183,929 B1 | 2/2007 | Antebi et al. |
| 7,260,221 B1 | 8/2007 | Atsmon |
| 7,280,970 B2 | 10/2007 | Tamir et al. |
| 7,334,735 B1 | 2/2008 | Antebi et al. |
| 2001/0047486 A1 | 11/2001 | Green et al. |
| 2001/0055202 A1 | 12/2001 | Templeton et al. |
| 2002/0019939 A1 | 2/2002 | Yamamoto et al. |
| 2002/0112171 A1 | 8/2002 | Ginter et al. |
| 2002/0156917 A1 | 10/2002 | Nye |
| 2002/0157034 A1 | 10/2002 | Sagar |
| 2002/0169608 A1 | 11/2002 | Tamir et al. |
| 2003/0147547 A1 | 8/2003 | Lin et al. |
| 2003/0159040 A1 | 8/2003 | Hashimoto et al. |
| 2004/0031856 A1 | 2/2004 | Atsmon et al. |
| 2004/0053642 A1 | 3/2004 | Sandberg et al. |
| 2004/0220807 A9 | 11/2004 | Tamir et al. |
| 2004/0236819 A1 | 11/2004 | Anati et al. |
| 2004/0260556 A1 | 12/2004 | Hoffberg et al. |
| 2005/0044561 A1 | 2/2005 | McDonald |
| 2005/0172137 A1 | 8/2005 | Hopkins |
| 2006/0136544 A1 | 6/2006 | Atsmon et al. |
| 2006/0229114 A2 | 10/2006 | Kim |
| 2006/0271646 A1 | 11/2006 | Janky et al. |
| 2006/0288374 A1 | 12/2006 | Ferris et al. |
| 2007/0112566 A1 | 5/2007 | Chen |
| 2007/0135984 A1 | 6/2007 | Breed et al. |
| 2008/0034410 A1 | 2/2008 | Udupa et al. |
| 2008/0071537 A1 | 3/2008 | Tamir et al. |
| 2008/0173717 A1 | 7/2008 | Antebi et al. |
| 2009/0175318 A1 | 7/2009 | Koenck et al. |
| 2010/0030838 A1 | 2/2010 | Atsmon et al. |

FOREIGN PATENT DOCUMENTS

| | | |
|---|---|---|
| EP | 0526015 | 2/1993 |
| EP | 0789320 | 8/1997 |
| EP | 0872995 | 10/1998 |
| EP | 0933733 | 8/1999 |
| GB | 2236258 | 4/1991 |
| JP | 62-060076 | 3/1987 |
| JP | 01-226091 | 9/1989 |
| JP | 07-087234 | 3/1995 |
| WO | WO 93/11619 | 6/1993 |
| WO | WO 93/21720 | 10/1993 |
| WO | WO 94/17498 | 8/1994 |
| WO | WO 96/10880 | 4/1996 |
| WO | WO 97/15899 | 5/1997 |
| WO | WO 97/16049 | 5/1997 |
| WO | WO 98/12670 | 3/1998 |
| WO | WO 98/57474 | 12/1998 |
| WO | WO 99/22362 | 5/1999 |
| WO | WO 99/23804 | 5/1999 |
| WO | WO 00/01456 | 1/2000 |
| WO | WO 00/15316 | 3/2000 |
| WO | WO 00/21020 | 4/2000 |
| WO | WO 00/21203 | 4/2000 |
| WO | WO 00/29920 | 5/2000 |
| WO | WO 00/77751 | 12/2000 |
| WO | WO 01/82223 | 11/2001 |
| WO | WO 02/14974 | 2/2002 |
| WO | WO 02/076717 | 10/2002 |
| WO | WO 02/078199 | 10/2002 |

OTHER PUBLICATIONS

International Preliminary Examination Report Dated Mar. 21, 2001 From the International Preliminary Examining Authority of The Patent Cooperation Authority Re.: Application No. PCT/IL99/00525.

International Search Report Dated Dec. 3, 2002 from the International Searching Authority of the Patent Cooperation Treaty Re.: Application No. PCT/IL02/00236.

International Search Report Dated Jul. 5, 2000 From the International Searching Authority of the Patent Cooperation Treaty Re.: Application No. PCT/IB99/02110.

International Search Report Dated Dec. 9, 2002 From the International Searching Authority of the Patent Cooperation Treaty Re.: Application No. PCT/US02/90342.

International Search Report Dated Feb. 17, 2000 From the International Searching Authority of the Patent Cooperation Treaty Re.: Application No. PCT/IL99/00521.

International Search Report Dated Jul. 21, 2000 From the International Searching Authority of the Patent Cooperation Treaty Re.: Application No. PCT/IL99/00506.

International Search Report Dated Mar. 25, 1999 From the International Searching Authority of the Patent Cooperation Treaty Re.: Application No. PCT/IL98/00450.

International Search Report Dated Mar. 26, 2002 From the International Searching Authority of the Patent Cooperation Treaty Re.: Application No. PCT/IL01/00758.

International Search Report Dated Sep. 28, 2000 From the International Searching Authority of the Patent Cooperation Treaty Re.: Application No. PCT/IL99/00525.
International Search Report Dated Apr. 4, 2000 From the International Searching authority of the Patent Cooperation Treaty Re.: Application No. PCT/IL99/00525.
Notice of Allowance Dated Jan. 2, 2008 from the United States Patent and Trademark Office Re.: U.S. Appl. No. 09/806,618.
Notice of Allowance Dated Jun. 4, 2007 from the United States Patent and Trademark Office Re.: U.S. Appl. No. 09/853,017.
Notice of Allowance Dated Oct. 4, 2007 from the United States Patent and Trademark Office Re.: U.S. Appl. No. 09/806,789.
Notice of Allowance Dated Aug. 5, 2008 From the United States Patent and Trademark Office Re.: U.S. Appl. No. 11/339,275.
Notice of Allowance Dated Jun. 7, 2005 From the United States Patent and Trademark Office re.: U.S. Appl. No. 09/806,618.
Notice of Allowance Dated Oct. 26, 2006 From the United States Patent and Trademark Office Re.: U.S. Appl. No. 09/743,065.
Official Action Dated Jun. 2, 2005 From the United States Patent and Trademark Office Re.: U.S. Appl. No. 09/853,017.
Official Action Dated Sep. 2, 2004 From the United States Patent and Trademark Office Re.: U.S. Appl. No. 09/806,789.
Official Action Dated Aug. 4, 2008 From the United States Patent and Trademark Office Re.: U.S. Appl. No. 10/618,962.
Official Action Dated Jun. 4, 2007 From the United States Patent and Trademark Office Re.: U.S. Appl. No. 10/618,962.
Official Action Dated Apr. 6, 2006 From the United States Patent and Trademark Office Re.: U.S. Appl. No. 09/806,618.
Official Action Dated Jan. 7, 2005 From the United States Patent and Trademark Office Re.: U.S. Appl. No. 09/853,017.
Official Action Dated Oct. 7, 2004 From the United States Patent and Trademark Office Re.: U.S. Appl. No. 09/806,618.
Official Action Dated Jan. 9, 2006 From the United States Patent and Trademark Office Re.: U.S. Appl. No. 09/853,017.
Official Action Dated Feb. 11, 2008 From the United States Patent and Trademark Office Re.: U.S. Appl. No. 09/787,265.
Official Action Dated Aug. 12, 2004 From the United States Patent and Trademark Office Re.: U.S. Appl. No. 09/831,935.
Official Action Dated Jun. 13, 2007 From the United States Patent and Trademark Office Re.: U.S. Appl. No. 11/339,275.
Official Action Dated Nov. 14, 2006 From the United States Patent and Trademark Office Re.: U.S. Appl. No. 09/806,789.
Official Action Dated Dec. 17, 2003 From the United States Patent and Trademark Office Re.: U.S. Appl. No. 09/853,017.
Official Action Dated May 17, 2005 From the United States Patent and Trademark Office Re.: U.S. Appl. No. 09/831,935.
Official Action Dated Jan. 18, 2008 From the United States Patent and Trademark Office Re.: U.S. Appl. No. 10/618,962.
Official Action Dated Jun. 19, 2007 From the United States Patent and Trademark Office Re.: U.S. Appl. No. 09/806,789.
Official Action Dated Mar. 19, 2008 From the United States Patent and Trademark Office Re.: U.S. Appl. No. 10/668,109.
Official Action Dated Feb. 21, 2008 From the United States Patent and Trademark Office Re.: U.S. Appl. No. 11/339,275.
Official Action Dated May 21, 2007 From the United States Patent and Trademark Office Re.: U.S. Appl. No. 09/806,618.
Official Action Dated Oct. 23, 2003 From the United States Patent and Trademark Office Re.: U.S. Appl. No. 09/787,265.
Official Action Dated Jan. 25, 2003 From the United States Patent and Trademark Office Re.: U.S. Appl. No. 09/787,265.
Official Action Dated May 25, 2005 From the United States Patent and Trademark Office Re.: U.S. Appl. No. 09/806,789.
Official Action Dated Sep. 25, 2006 From the United States Patent and Trademark Office Re.: U.S. Appl. No. 09/787,265.
Official Action Dated Sep. 25, 2006 From the United States Patent and Trademark Office Re.: U.S. Appl. No. 11/339,275.
Official Action Dated Jan. 26, 2006 From the United States Patent and Trademark Office Re.: U.S. Appl. No. 09/831,935.
Official Action Dated Oct. 29, 2008 From the US Patent and Trademark Office Re.: U.S. Appl. No. 09/787,265.
Official Action Dated Aug. 30, 2006 From the United States Patent and Trademark Office Re.: U.S. Appl. No. 09/853,017.
Supplemental Notice of Allowability Dated Dec. 16, 2008 From the US Patent and Trademark Office Re.: U.S. Appl. No. 11/339,275.
Written Opinion Dated Aug. 16, 2000 From the International Preliminary Examining Authority of the Patent Cooperation Treaty re.: Application No. PCT/IL99/00525.
Ahuja et al. "An Analog Front End for a Two-Chip 2400-Bit/s Voice-Band Modem", Intel Corporation, IEEE Journal of Solid-State Circuits, 22(6): 996-1003, 1987. Abstract.
Encotone "The Technology", TeleIDTM System, Encotone Ltd., 8 P., Retrieved From the Internet: <http://web.archive.org/web/19981205063057/www.encotone.com/html/tech_def.html>, 1998.
Encotone Encotone, Ltd.—Corporate Background, 2 P., 1998. Retrieved From the Internet: <http://web.archive.org/web/19981205164055/www.encotone.com/html/comp_def.html>.
Notice of Allowance Dated Mar. 24, 2009 From the US Patent and Trademark Office Re.: U.S. Appl. No. 09/787,265.
Official Action Dated Jan. 6, 2009 From the US Patent and Trademark Office Re.: U.S. Appl. No. 10/668,109.
Official Action Dated Mar. 18, 2009 From the US Patent and Trademark Office Re.: U.S. Appl. No. 10/618,962.
Official Action Dated Jul. 22, 2009 From the US Patent Trademark Office Re.: U.S. Appl. No. 12/007,441.
Official Action Dated Sep. 24, 2009 From the US Patent and Trademark Office Re.: U.S. Appl. No. 10/668,109.
Official Action Dated Jun. 29, 2007 From the US Patent and Trademark Office Re.: U.S. Appl. No. 09/787,265.
Official Action Dated Jul. 22, 2010 From the US Patent and Trademark Office Re.: U.S. Appl. No. 12/007,441.
Official Action Dated Aug. 6, 2010 From the US Patent and Trademark Office Re.: U.S. Appl. No. 12/079,000.
Notice of Allowance Dated Dec. 11, 2009 From the US Patent and Trademark Office Re.: U.S. Appl. No. 10/618,962.
Official Action Dated Feb. 3, 2010 From the US Patent and Trademark Office Re.: U.S. Appl. No. 12/007,441.
Official Action Dated Mar. 10, 2010 From the US Patent and Trademark Office Re.: U.S. Appl. No. 11/902,009.
Official Action Dated Jan. 15, 2010 From the US Patent and Trademark Office Re.: U.S. Appl. No. 11/902,009.
Response Dated Feb. 2, 2010 to Official Action of Jan. 15, 2010 From the US Patent and Trademark Office Re.: U.S. Appl. No. 11/902,009.
Response Dated Mar. 24, 2010 to Official Action of Sep. 24, 2009 From the US Patent and Trademark Office Re.: U.S. Appl. No. 10/668,109.
Response Dated Mar. 31, 2010 to Official Action of Feb. 3, 2010 From the US Patent and Trademark Office Re.: U.S. Appl. No. 12/007,441.
Official Action Dated Apr. 29, 2010 From the US Patent and Trademark Office Re.: U.S. Appl. No. 10/668,109.
Supplementary European Search Report Dated Feb. 24, 2010 From the European Patent Office Re.: Application No. 01908897.0.
Response Dated Jul. 12, 2010 to Official Action of Mar. 10, 2010 From the US Patent and Trademark Office Re.: U.S. Appl. No. 11/902,009.
Response Dated Aug. 22, 2010 to Official Action of Apr. 29, 2010 From the US Patent and Trademark Office Re.: U.S. Appl. No. 10/668,109.
Notice of Allowance Dated Aug. 16, 2010 From the US Patent and Trademark Office Re.: U.S. Appl. No. 11/902,009.
Official Action Dated Feb. 11, 2008 From the United States Patent and Trademark Office Re.: U.S. Appl. No. 09/787,265.
Response Dated Mar. 31, 2010 to Official Action of Feb. 3, 2010 From the US Patent and Trademark Office Re.: U.S. Appl. No. 12/007,441.

* cited by examiner

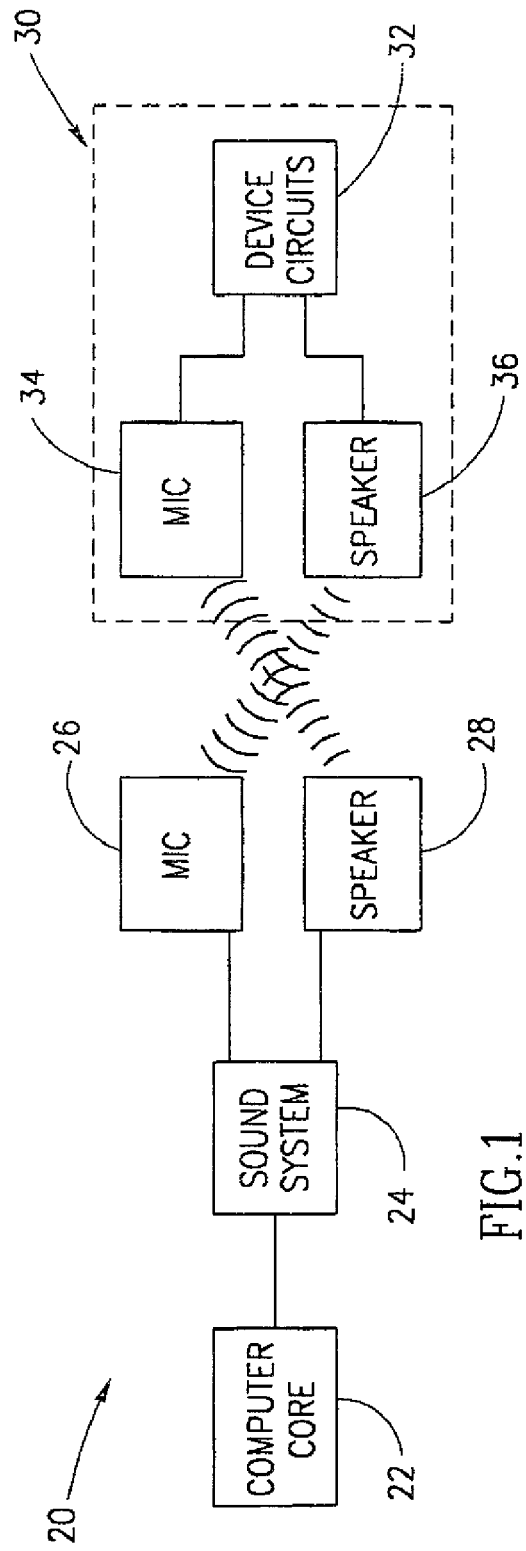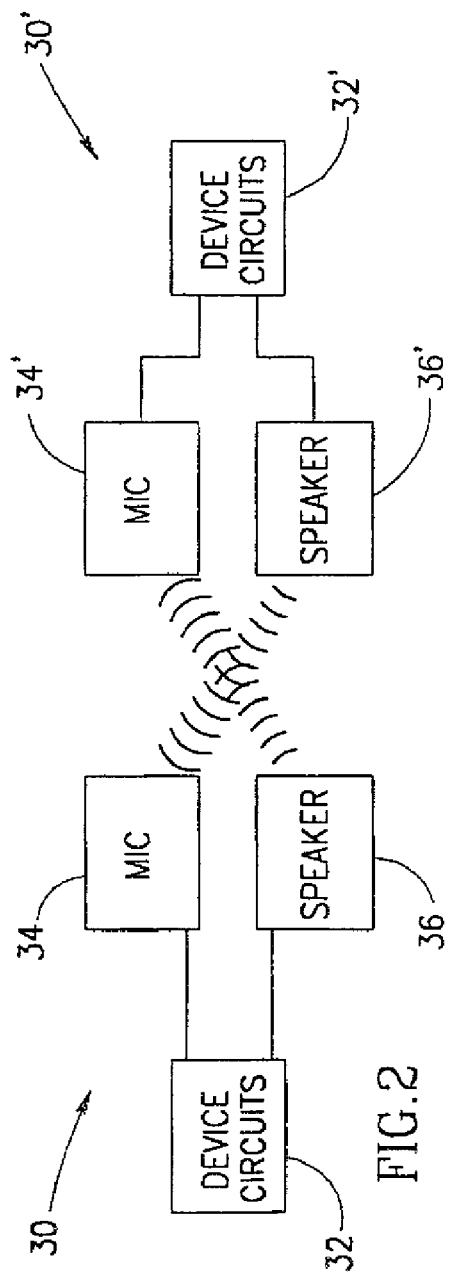

US 7,941,480 B2

COMPUTER COMMUNICATIONS USING ACOUSTIC SIGNALS

RELATED APPLICATIONS

This application is a divisional application of U.S. patent application Ser. No. 11/339,275 filed on Jan. 25, 2006, which is a divisional application of U.S. patent application Ser. No. 09/806,618 filed on Oct. 9, 2001, which is a national phase of PCT Patent Application No. PCT/IL99/00521 filed Oct. 1, 1999, which claims the benefit of U.S. Provisional Patent Applications Nos. 60/115,231 filed Jan. 8, 1999, 60/122,687, filed Mar. 3, 1999, 60/143,220, filed Jul. 9, 1999, 60/145,342, filed Jul. 23, 1999 60/153,858 filed Sep. 14, 1999, and Israel Patent Application Nos. 127569 filed on Dec. 14, 1998, 127072 filed on Nov. 16, 1998, and 126444 filed on Oct. 2, 1998. PCT/IL99/00521 is also a continuation-in-part of PCT Patent Application Nos. PCT/IL99/00470 filed Aug. 27, 1999 and PCT/IL99/005061 filed Sep. 16, 1999. The disclosures of all of these applications are incorporated herein by reference.

FIELD OF INVENTION

The present invention relates generally to method of interaction with a computer and especially to methods that use acoustic signals for such communications.

BACKGROUND OF THE INVENTION

Computer network components that communicate using RF radiation, wires or IR radiation are well known. In addition, some home appliances are controlled using an ultrasonic remote control. Other types of dedicated ultrasonic acoustic links are also known.

However, such dedicated communication mechanisms require that the computer network components have installed thereon specialized communication hardware. Installing such hardware on an existing computer may be expensive and/or problematic. Further, some electronic and/or computer embedded devices, for example cellular telephones may be "sealed" products, to which it is impossible to add internal components.

PCT publications WO96/10880, WO94/17498, WO93/21720 and WO93/11619, the disclosures of which are incorporated herein by reference, describe an electronic device which transmits coded information to a microphone of a telephone using a DTMF-like encoding scheme. A WWW page addressed "http://www.encotone.com/html/tech_def.html", available on Feb. 1, 1999 and predated, suggests using such a device to transmit audible DTMF-like tones to a personal computer using the computer's sound card.

Two way communications using audible DTMF-like tones, between a smart card and a telephone communication system is described in U.S. Pat. No. 5,583,933, the disclosure of which is incorporated herein by reference.

SUMMARY OF THE INVENTION

One object of some preferred embodiments of the invention is to simplify interaction between electronic devices by removing a common requirement of installing dedicated communication hardware on the devices. Some suitable electronic devices include: computers (e.g., desktop and laptop), televisions, watches, PDAs (Personal Digital Assistant), organizers, electronic toys, electronic games, voice-responsive appliances, wireless communication devices, answering machines and desktop telephones. As used herein the term "electronic device" is used to encompass a broad range of electronics-including devices. In some of the embodiments described below, a particular type of electronic device is singled out, for example a computer or a toy, as some of the below-described embodiments are more useful for some types of electronic devices, than for other types of electronic devices. However, such examples are not meant to limit the scope of the invention.

An object of some preferred embodiments of the invention is allowing electronic devices to communicate using an input and/or output channel, preferably an acoustic channel, but possibly a visual channel, which was designed for communication with human users and not for communication with electronic devices. In other cases, the communication channel is not originally intended for communication with outside components at all, for example, a diskette drive.

An object of some preferred embodiments of the invention is to allow a smart card to be read by and written to using standard computer hardware without requiring an installation of specialized hardware. This is especially useful for electronic wallets and Internet commerce, where the cost of installing dedicated hardware may prevent wide acceptance of these commercial methods. Additionally, using a smart card can provide methods of solving the security and accountability issues entailed in electronic commerce.

An aspect of some preferred embodiments of the invention relates to communicating with a computer using a sound card installed on the computer. In some computer configurations the installation is permanent, for example as part of the motherboard chip-set. In a preferred embodiment of the invention, a device, preferably a smart card, transmits information to the sound card's microphone and receives information from the computer using the sound card's (or the computer's) loudspeaker. Preferably, the transmission uses non-audible acoustic frequencies, for example ultrasonic or infrasonic frequencies. It should be noted that standard music cards are designed for music generation, and specifically for audible audio frequencies, such as between 20 Hz and 16 kHz, however, they have a limited reception and transmission ability in the near-ultrasonic (e.g., between 16 kHz and 50 kHz) and infrasonic (e.g., 0.01 Hz to 20 or 40 Hz) frequency ranges. The definition of audible frequencies will usually depend on the user and this, may, in some embodiments, impact on the selection of frequencies for use. Possibly, a personalization software for selecting the frequencies will be provided. Also, in some applications, the higher end of the audible range may be used, for example 14 kHz-16 kHz, as the sensitivity to these frequencies is quite low, even in those individuals that can detect them.

Ultrasonic communication has several advantages over audio communication:

(a) smaller transducers can be used;
(b) transmission is more efficient;
(c) lower noise levels are typical;
(d) resonant frequencies that have wavelengths on the order of a size of a credit card can be used; and
(e) higher data rates can be achieved.

In a preferred embodiment of the invention, the ultrasonic frequencies used are low ultrasonic frequencies or high audible frequencies, for example between 15 kHz and 24 kHz, more preferably between 17 kHz and 20 kHz and, in some preferred embodiments, between 21 and 23 kHz. Often, these frequencies can be transmitted and/or received using standard audio components. For this reason, lower frequencies may be preferred over higher frequencies, even though the lower frequencies typically afford a lower data rate and are more easily disrupted. These particular frequencies are suggested because they match industry standards for sampling in audio cards (e.g., "SoundBlaster"). If other sampling frequencies are available, the preferred frequency may adjusted accordingly. Preferably, a minimum frequency used is selected so that it is inaudible to a human. In some cases, the frequency selection may depend on the age of the human.

A benefit of ultrasound over RF transmission is that the range of the ultrasonic transmission can easily be controlled by varying its amplitude. Typically, ultrasonic transmissions do not pass through walls, potentially providing increased security by limiting eavesdropping and inference from outside the room. In addition, ultrasonic transmissions do not usually interfere with the operation of electronic equipment, even when used at a high power setting. Thus, ultrasonic communication is better suited for people with pacemakers and for hospital settings. Another advantage of acoustic transmission is a reduced perceived and actual health danger to the user.

An aspect of some preferred embodiments of the invention relates to communication between electronic devices using acoustics. Alternatively or additionally to electronic devices communicating using RF; varying magnetic fields; IR; and visible light, electronic devices may communicate using acoustics, in accordance with preferred embodiments of the invention. In some cases, one communication direction is acoustic and the other is non-acoustic, for example RF or IR, for example when communicating with a set-top box in accordance with a preferred embodiment of the invention (one way acoustic from the TV and the other way IR, in the same manner as with an IR remote control). In a preferred embodiment of the invention, the acoustic waves used for communications are incorporated in sounds used for regular operation of the device which generates the sounds, for example by modulating beeps. Alternatively or additionally, the sounds are inaudible, for example being ultrasonic, infrasonic, of a low amplitude and/or causing only small changes in amplitude and/or frequency of an existing sounded signal.

It is noted that many electronic devices include a microphone and/or a speaker. In a preferred embodiment of the invention, the microphone and/or speaker are used to communicate with the device. In one example, an acoustic smart card (or an "electronic wallet" card) communicates with such a device using sound and/or ultrasound. Such a smart card may transmit information stored thereon. Possibly, the information is encrypted, for example, using RSA or DSA encryption.

In a preferred embodiment of the invention, a smart card may be "swiped" at many existing computers and electronic devices, possibly requiring a simple software installation, but no hardware installation (assuming some acoustic hardware exists). Such simple swiping should ease acceptance of the card by Internet browsing home shoppers. In some cases, the swiping software may be downloaded as a Java Applet or as a script in a different network programming language.

In some embodiments other types of electronic devices communicate. For example, a cellular telephone and a PDA, each of which includes a microphone and a speaker, can communicate. Another example is programming a cellular telephone with names and numbers stored in a PDA or for the cellular telephone to interrogate the PDA regarding a particular telephone number. Alternatively or additionally, a network may be formed of a plurality of such devices, possibly, with one device forwarding messages from a first device to a second device. Alternatively or additionally, peripherals may be connected to a computer using an acoustic connection, without requiring wiring or special hardware. In some embodiments, a single acoustic transducer (microphone or speaker) may be controllable to act as both a receiver and a transmitter, by suitably programming the electronic device.

Many computers are sold with a Sound-Blaster Compatible sound subsystem, stereo speakers and a microphone. Some computers are provided with other types of sound systems, which types also support the application of preferred embodiments of the invention, possibly with a variation in frequencies to account for different circuit or sampling characteristics. Typically, this sound system is designed for generating music and other audible sounds. In addition, many computers include an internal speaker and a modem speaker. Some computers use USB speakers that are connected directly to the USB (Universal Serial Bus).

It should be appreciated that in some embodiments of the invention the sound communication is directed at the device for its use, control and/or processing and is not meant for mere passing through the device. For example, a telephone may interpret computer-information encoding signals, rather than transmitting them on through the telephone network, as is done in the art. In a preferred embodiment of the invention, a wireless telephone is realized using ultrasonic communication between a base station and the hand set. In a preferred embodiment of the invention, the base station is embodied in a computer, which communicates with the telephone. Possibly, the wireless communication uses the same loudspeaker and/or microphone as used for communication with a person using the telephone and/or the computer. Additionally or alternatively, the handset is used for Internet telephony, via the computer without a cradle or other special connection between the computer and the telephone.

An aspect of some preferred embodiments of the invention relates to interfacing a device possibly a toy) with a computer system without installing special or dedicated hardware on the computer. Such interfacing may use EM-coupling into cables attached to the computer, detection of RF signals from a computer or direct input into a mouse or a keyboard. In one preferred embodiment, the loudspeakers, already installed on a computer, are used to interrogate an identification device, using ultrasound. Preferably, the computer's microphone is used to detect a response from the interrogated device. In some embodiments, especially for toys, the interrogation may comprise audible sounds. Thus, in a preferred embodiment of the invention, cheap and/or simple communication between a device and another device or a computer is feasible, since no special computer hardware is required. In addition, it becomes simpler to interface an input device with a computer program that responds to that input device. Additionally or alternatively, ultrasonic communications may be used to download a program and or music file to a toy or other devices. Possibly, the program and/or music file are directly downloaded from an Internet as sound files, possibly reducing or obviating the need for a dedicated toy (or device) programming software interface. Possibly, the toy and/or device generate sounds in response, which sounds are transmitted back through the Internet.

In a preferred embodiment of the invention, the acoustic waves used for communication or, possibly, another set of acoustic waves, may be used to determine the relative position and/or orientation of electronic devices. In a preferred embodiment of the invention, a touch screen is emulated by interrogating a transponder on a pointing implement, using built-in speakers of an electronic device, to detect the position, orientation and/or motion of the implement, thereby identifying a location which is "touched" or pointed to. In a preferred embodiment of the invention, the transponder is embodied using a speaker and a microphone of the pointing implement, for example if the implement is a cellular telephone.

For example, one or more of the following sound generators may be available in a personal computer: built-in speaker, modem speaker and sounds generated by mechanical devices, such as a hard disk drive or a diskette drive. These sound generators may also be used for transmitting information.

An aspect of some preferred embodiments of the invention relates to visual communication between devices, using built in hardware. In one example a video camera, which is provided with many computers, can be used to accept visual signaling from a second device. Such visual signaling may be temporal, for example by flashing a screen or a LED. Alternatively or additionally, the signaling uses a spatial code, for example, by the remote camera identifying visual spatial patterns on a screen, for example using OCR techniques. Possibly, the frequency of flashes is higher than perceived by a human observer, in order to reduce distraction. It is noted that communication between a screen and a video camera enables a wide bandwidth and/or enhanced error correction, due to the large number of transmission and reception pixels available. Alternatively or additionally, an existing IR port is used as a source, which source is detectable by many CCD cameras.

An aspect of some preferred embodiments of the invention relates to communicating with a device using RF, rather than acoustics. In a preferred embodiment of the invention, the RF generated by a computer speaker, rather than the generated sounds, is detected by a second device. In an exemplary embodiment, a smart-card detects the RF generated by a telephone loudspeaker, rather than sounds. Alternatively or additionally, a device may induce electric fields in a microphone by transmitting RF fields at ultrasonic or sonic frequencies. Alternatively or additionally, a computer can produce measurable and encodable electromagnetic waves by transmitting information on a plurality of data buses simultaneously, so that a stronger signal is detected outside the computer.

An aspect of some preferred embodiments of the invention relates to detecting the simultaneous generation of RF and acoustic pulses to determine a distance between objects. If the two pulses are generated simultaneously, the delay between their detection is dependent on the distance between the objects. The two pulses may be generated by a single device, such as a computer speaker or they may be generated by separate devices, such as a computer speaker and a BlueTooth RF link. In an exemplary application, a computer speaker generates the two pulses simultaneously and a microphone on a smart card detects two pulses, one corresponding to the RF and one corresponding to the acoustics. Possibly, two sensors are provided on the card, one for each modality, however, a combined sensor, such as a piezoelectric microphone is preferred. The processing may be on the smart card. Alternatively, the acquired signals may be forwarded to a computer for processing. One exemplary method of determining the delay is by autocorrelation of the received signal. The pulses used may be temporally symmetric or asymmetric.

An aspect of some preferred embodiments of the invention relates to using a computer microphone to acquire ambient sounds, then analyzing these sounds using a computer, and then using the analysis to determine events occurring in its neighborhood. Optionally, these sounds are transmitted to remote location, either as sound files or as data files for basic and/or further analysis. In a preferred embodiment of the invention, electronic devices are designed and/or programmed to generate sounds (possibly in the ultrasonic range), which sounds represent their current state or particular events. Thus, by eavesdropping on these sounds it is possible to determine the status of electronic devices. In one example, a malfunctioning fax machine will generate one hum and/or an arriving fax on an operating fax machine will generate a different hum or sound pattern A computer near the fax machine can determine the status and events and transmit this information, possibly using a computer network, to a user of the information. In some cases, the existing sounds generated by a fax (beeping, printing noises etc.) can be identified by the computer, without need for special programming of the fax machine to generate novel sounds.

An aspect of some preferred embodiments of the invention relates to interrogating an electronic device using an acoustic channel. Such interrogation should not adversely affect the operation of the devices. In one example, the device is a network component, such as a hub. In another example, the device is a computer. In a preferred embodiment of the invention, the acoustic channel is controlled by the computer (analysis of incoming information, generation of outgoing transmissions, and possibly execution of certain software) without interfering with the work of a person using that computer, for example word processing work.

An aspect of some preferred embodiments of the invention relates to communicating with a speaker and/or a microphone using non-airborne transmission of the sounds. In an exemplary embodiment of the invention, sounds are transmitted over electrical cabling in a home, for example between two wall sockets. In another exemplary embodiment, the casing of a device and/or cables attached thereto are used to propagate sonic or ultrasonic signals to a microphone or from a loudspeaker.

An aspect of some preferred embodiments of the invention relates to a thin-client architecture in which a thin client is displays information and/or transmits input to a controller of the thin client using ultrasonic waves. An advantage of such an architecture is that the controller may be any suitable electronic device which has a speaker, with some suitable software modifications or with a suitable hardware attachment. In an exemplary application, a user can use a watch like instrument to display the status and/or control a home automation system. Alternatively or additionally, the watch can sound radio transmissions (or other messages) which are forwarded by ultrasound to the watch, for example by a computer with a radio card or by a digital radio. Possibly, the instrument includes one or more inputs which can be forwarded to the controller, again, preferably by ultrasound. These inputs may be mapped to the controller's controls or they may interact with suitable software at the controller. Although software execution on the instrument is possible in some embodiments, it is not preferred. Alternatively or additionally, although acoustic transmission is preferred, in some preferred embodiments of the invention RE or other transmission methods are used.

There is thus provided in accordance with a preferred embodiment of the invention, a method of communicating with an electronic device, comprising:

providing a computer having an audible sound receiving and generating sub-system including a microphone;

transmitting from a source at least one ultrasonic acoustic signal, encoded with information to the computer; and receiving said at least one signal by said microphone, to be detected by said computer.

There is also provided in accordance with a preferred embodiment of the invention, a method of communicating with an electronic device, comprising:

providing a computer having an audible sound receiving and generating sub-system including a microphone and a loudspeaker;

transmitting from a source at least one first acoustic signal, encoded with information to the computer;

receiving said at least one signal by said microphone, to be detected by said computer; and transmitting to said source, using said loudspeaker, at least a second acoustic signal, encoded with information, in response with said detected signal. Preferably, at least one of said at least one first signal and at least a second signal comprise an ultrasonic signal.

There is also provided in accordance with a preferred embodiment of the invention, a method of communicating with an electronic device, comprising:

providing an electronic device having a sound receiving and generating sub-system including a microphone and a loudspeaker;

transmitting from a source at least one ultrasonic acoustic signal, encoded with information, to the electronic device;

receiving said at least one signal by said microphone, to be detected by said electronic device; and transmitting to said source, using said loudspeaker, at least a second ultrasonic acoustic signal, encoded with information, in response with said detected signal. Preferably, said electronic device comprises a computer.

There is also provided in accordance with a preferred embodiment of the invention, a method of communicating with an electronic device, comprising:

providing a telephone having a sound receiving and generating sub-system including a microphone;

transmitting from a source at least one acoustic signal, encoded with information to the telephone; and receiving said at least one signal by said microphone, to be used to control said telephone. Preferably, said acoustic signal comprises an ultrasonic signal.

There is also provided in accordance with a preferred embodiment of the invention, a method of communicating with an electronic device, comprising:

providing a computer having a sound receiving and generating sub-system including a microphone;

transmitting from a source at least one acoustic signal, encoded with information to the computer; and receiving said at least one signal by said microphone; and forwarding an indication of said information to a remote computer, over an Internet. Preferably, said indication comprises a sound file. Alternatively, said indication comprises a data file.

In a preferred embodiment of the invention, said acoustic signal comprises an ultrasonic signal.

In a preferred embodiment of the invention, said computer comprises a PDA, personal digital assistant. Alternatively, said computer comprises a portable computer. Alternatively, said computer comprises a desk-top computer.

In a preferred embodiment of the invention, the method comprises processing said at least one sound by said computer. Preferably, processing comprises extracting said encoded information. Alternatively or additionally, said processing comprises determining a distance between said microphone and said source. Alternatively or additionally, said processing comprises determining movement of said microphone relative to said source. Preferably, said movement comprises angular movement. Alternatively or additionally, said movement comprises translation.

In a preferred embodiment of the invention, said processing comprises determining a spatial position of said microphone relative to said source. Preferably, said spatial position is a one-dimensional spatial position. Alternatively, said spatial position is a two-dimensional spatial position. Alternatively, said spatial position is a three-dimensional spatial position.

In a preferred embodiment of the invention, said processing comprises emulating a touch screen using said received at least one sound. Alternatively or additionally, said processing comprises emulating a pointing device using said received at least one sound.

In a preferred embodiment of the invention, the method comprises controlling at least one action of a toy, responsive to said received at least one sound.

In a preferred embodiment of the invention, said electronic device comprises a wireless communication device. Alternatively, said device comprises a toy.

In a preferred embodiment of the invention, said electronic device comprises a computer peripheral. Preferably, said peripheral comprises a printer.

In a preferred embodiment of the invention, said information comprises programming information. Alternatively or additionally, said information comprises music.

In a preferred embodiment of the invention, said source comprises a toy. Preferably, said information comprises stored player input.

In a preferred embodiment of the invention, said source comprises a smart card. Alternatively, said source comprises a wireless communication device. Alternatively, said source comprises a computer. Alternatively, said source comprises a computer peripheral.

In a preferred embodiment of the invention, said information comprises personal information.

In a preferred embodiment of the invention, the method comprises logging into a computer system responsive to said at least transmitted signal.

In a preferred embodiment of the invention, the method comprises transmitting at least a second acoustical signal responsive to said received at least one signal.

In a preferred embodiment of the invention, said acoustic signal comprises human audible sound. Preferably, said sound has a main frequency over 10 kHz.

Alternatively, said sound has a main frequency which is infra-sonic.

In a preferred embodiment of the invention, said information is encoded using below human-threshold amplitude signals. Alternatively or additionally, said information is encoded using below human-threshold amplitude variations.

In a preferred embodiment of the invention, said sound is generated at a frequency outside a normal operating frequency for said sound subsystem. Alternatively or additionally, said sound subsystem is designed for generating musical sounds.

In a preferred embodiment of the invention, said sound subsystem comprises a sound card. Preferably, said sound card comprises a SoundBlaster compatible sound card.

In a preferred embodiment of the invention, said sound sub-system is designed for audible sound communication with a human operator.

In a preferred embodiment of the invention, said ultrasonic signal has a main frequency is below 70, 60 or 50 kHz. Alternatively or additionally, said ultrasonic signal has a main frequency below 35 kHz. Alternatively or additionally, said ultrasonic signal has a main frequency below 25 kHz. Alternatively or additionally, said ultrasonic signal has a main frequency of about 21 kHz. Alternatively or additionally, said ultrasonic signal has a main frequency of about 20 kHz. Alternatively or additionally, said ultrasonic signal has a main frequency of about 19 kHz. Alternatively or additionally, said ultrasonic signal has a main frequency of below 18 kHz.

There is also provided in accordance with a preferred embodiment of the invention, a method of creating a smart card terminal, comprising:

providing a general purpose computer having a general-purpose sound sub-system; and loading a smart-card terminal software on said computer, wherein said software controls said sound system to receive acoustic waves from a smart card and transmit acoustic waves to the smart card. Preferably, said software analyses said received acoustic waves to determine information encoded by said acoustic waves. Alternatively or additionally, said software retransmits said acoustic waves to a remote computer which analyses said received acoustic waves to determine information encoded by said acoustic waves. Alternatively or additionally, loading a smart-card terminal software comprises downloading the software over an Internet. Alternatively or additionally, said acoustic waves comprise ultrasonic waves. Alternatively or additionally, said smart-card comprises a memory for storing a monetary balance. Alternatively or additionally, said software encrypts information encoded by said transmitted acoustic waves. Alternatively or additionally, said smart card comprises a memory for storing identification information for a card owner. Alternatively or additionally, said smart card comprises a processor for analyzing information received from said computer and for generating a response to said computer.

There is also provided in accordance with a preferred embodiment of the invention, a computer system comprises:
a processor;
a sound sub-system, designed for generating music, comprising:
a speaker which generates acoustic waves; and
a microphone which detects acoustic waves;
a memory; and
a software installed in said memory, wherein said software analyses acoustic waves received by said microphone to recognize information encoded by said acoustic waves and wherein said software uses said speaker to transmit information encoding acoustic waves responsive to said recognized information. Preferably, said acoustic waves comprise ultrasonic acoustic waves.

There is also provided in accordance with a preferred embodiment of the invention, a method of attaching a peripheral to a computer, comprising:

providing a general purpose computer including a sound generating and receiving subsystem;

analyzing, at said computer, sounds received by said subsystem to detect acoustic transmissions from said peripheral; and transmitting, from said computer and using said subsystem, information to said peripheral using encoded sound transmissions.

There is also provided in accordance with a preferred embodiment of the invention, method of communicating with a computer, comprising:

generating by a computer an electromagnetic field by driving a computer component not designed for field generation in a manner which generates a parasitic electromagnetic field, wherein said field is encoded with information by said generation; and receiving said encoded field by an electronic device. Preferably, said electronic device receives said wave using an RF antenna. Alternatively or additionally, said electronic device receives said wave using a microphone. Alternatively or additionally, said computer component comprises a speaker. Alternatively or additionally, said electromagnetic field has a main AC frequency of between 10 kHz and 100 kHz.

There is also provided in accordance with a preferred embodiment of the invention, a method of detecting electromagnetic radiation by a computer comprising:

generating an electro magnetic field which encodes information;

sampling a microphone channel associated with said computer to detect artifacts caused by said field; and decoding said information by said computer. Preferably, said associated computer is physically connected to said microphone channel. Alternatively, said associated computer is connected to said microphone channel by a computer network connection.

In a preferred embodiment of the invention, said electromagnetic field is a side-effect of driving a speaker. Preferably, said electromagnetic field is a side-effect of driving a speaker.

In a preferred embodiment of the invention, said electromagnetic field has a main AC frequency of between 10 kHz and 100 kHz.

There is also provided in accordance with a preferred embodiment of the invention, a method of emulating a microphone using a speaker, comprising:

providing a computer having a speaker channel and a microphone channel;

coupling a computer speaker to the microphone channel; and receiving signals for said microphone channel via said speaker. Preferably, coupling comprises coupling using a coupler.

There is also provided in accordance with a preferred embodiment of the invention, a coupler for an audio channel, comprising:

a first connector for selectively driving a speaker or receiving input from a microphone;

a second connector for sending signals to a microphone channel;

a third connector for receiving speaker-driving signals from a speaker channel; and circuitry for selectively driving said speaker or receiving signals from said microphone, using said first connector. Preferably, said circuitry receives switching instructions via said speaker channel.

There is also provided in accordance with a preferred embodiment of the invention, a method of determining a status of an electronic device, comprising:

receiving information encoding acoustic signals generated by said device; and analyzing said signals to determine an operational status associated with said device responsive to said information. Preferably, said status comprises a status of said device. Alternatively or additionally, said status comprises a status of a second device attached by computer communications with said device. Alternatively or additionally, said status comprises a status of a network that said device is part of. Alternatively or additionally, said analyzing comprises analyzing on a computer separate from a circuitry used for acquiring said signals. Alternatively or additionally, said signals are generated by said device responsive to an interrogation by a second device which performs said receiving. Preferably, said interrogation does not interrupt other activities of said device.

Alternatively, said signals are generated by said device independent of an interrogation by a second device.

In a preferred embodiment of the invention, said signals are sonic. Alternatively, said signals are ultrasonic.

In a preferred embodiment of the invention, the method comprises programming an existing device to generate said signals using an existing speaker which, when the device was designed, was not designated for communication with a second device. Preferably, said programming comprises software programming in which only memory storage locations are modified. Alternatively or additionally, said programming comprises hardware programming in which electronic circuitry of the device is modified.

In a preferred embodiment of the invention, said electronic device comprises a computer. Alternatively, said electronic device comprises a network hub. Alternatively, said electronic device comprises a network switch. Alternatively, said electronic device comprises a network router.

There is also provided in accordance with a preferred embodiment of the invention, a method of accessing a single user computer by a second user, without interrupting the activities of the first user, comprising:

transmitting an acoustically encoded command by the second user to the computer;

receiving said command by the computer; and executing the command by the computer. Preferably, said command is ultrasonically encoded. Alternatively or additionally, said receiving comprises receiving using a microphone connected to a sound card of said computer, which sound card is designed for audio applications.

There is also provided in accordance with a preferred embodiment of the invention, a computer networking method comprising:

providing first, second and third computers; and transmitting a message encoding data from the first computer to the third computer via the second computer by acoustic transmission between the computers. Preferably, said acoustic transmissions utilize sound cards designed specifically for processing audible sounds. Alternatively or additionally, said acoustic transmissions utilize are ultrasonic having a frequency of less than 50 kHz.

There is also provided in accordance with a preferred embodiment of the invention, a wireless peripheral for an electronic device, comprising:

a microphone for receiving ultrasonic acoustic transmissions having a frequency of less than 70 kHz from an electronic device;

circuitry for processing said transmission; and a display for displaying a result of said processing. Preferably, said peripheral comprises an input element and a speaker for transmitting sound to said electronic device responsive to input from said input element.

In a preferred embodiment of the invention, said peripheral comprises a printing engine for printing a result of said processing. Alternatively or additionally, said processing comprises merely of converting the signals from an acoustic encoding format to a format suitable for said display. Alternatively, said processing comprises processing the information encoded by said transmissions.

In a preferred embodiment of the invention, said electronic device comprises a computer. Alternatively or additionally, said electronic device comprises a radio. Alternatively or additionally, said peripheral comprises a speaker for said electronic device. Alternatively or additionally, said peripheral comprises a time display which presents a time signal generated by said electronic device. Alternatively or additionally, said peripheral comprises a status display which presents a status signal generated by said electronic device.

There is also provided in accordance with a preferred embodiment of the invention, a wireless peripheral for an electronic device, comprising:

a speaker for transmitting ultrasonic acoustic transmissions having a frequency of less than 70 kHz from an electronic device; and circuitry for generating said transmissions; and an input element for receiving input to be encoded by said transmissions. Preferably, the peripheral comprises a microphone for receiving ultrasonic transmissions from said electronic device. Alternatively or additionally, said input element comprises a bar-code reader. Alternatively or additionally, said input element comprises a smart card reader. Alternatively or additionally, said input element comprises a pointing device. Alternatively or additionally, said input element comprises a keyboard.

There is also provided in accordance with a preferred embodiment of the invention, a method of communicating with a computer, comprising:

providing a computer having a data line attached to at least one particular peripheral;

sending a data transmission to the computer by injecting a signal into said data line using an electromagnetic coupler; and identifying by said computer the source of said data transmission.

There is also provided in accordance with a preferred embodiment of the invention, a method of communicating with a computer, comprising:

providing a computer having a data line attached to at least one particular peripheral;

generating by said computer a data transmission directed to a different peripheral; and receiving said data transmission from the computer by eavesdropping on said data line using an electromagnetic coupler.

There is also provided in accordance with a preferred embodiment of the invention, a method of injecting data into a computer from an uncoupled peripheral, comprising:

transmitting said data from the uncoupled peripheral to a tap; and physically activating a peripheral coupled to said computer, by said tap. Preferably, physically activating comprises activating keys in a keyboard. Alternatively, physically activating comprises activating vibrating a mouse.

There is also provided in accordance with a preferred embodiment of the invention, a method of communicating with a computer, comprising:

generating by a computer a data transmission;

controlling, by said computer, a component not designated for data transmission, to effect a transmission of said data; and receiving said data transmission from the computer by a second device. Preferably, said computer controls an activation of a mechanical component of said computer to transmit said data by modulation of mechanical sounds generated by said computer. Alternatively or additionally, said computer controls an activation of a status LEDs of said computer to transmit said data by modulation of illumination of said LEDs. Alternatively or additionally, said computer controls an activation of an electrical component of said computer to transmit said data by modulation of parasitic RF signals generated by said computer.

There is also provided in accordance with a preferred embodiment of the invention, a method of transmitting data over a computer network, comprising:

providing a sound file at a first location;

transmitting said sound file to a second location via said computer network; and transmitting said sound file as acoustic sounds to a processor at a third location.

There is also provided in accordance with a preferred embodiment of the invention, a method of transmitting data over a computer network, comprising:

encoding data as acoustic sounds at a first location;

transmitting said sound file to a second location as acoustic sounds; and transmitting said acoustic sounds as a sound file to a third location, via said network.

In a preferred embodiment of the invention, said network comprises an Internet.

There is also provided in accordance with a preferred embodiment of the invention, a method of analyzing acoustic signals, comprising:

receiving said signals using a microphone which microphone converts the signals into analog electrical signals;

driving at least one digital data lead of an integrated circuit using said analog signals; and processing said signals using said integrated circuit. Preferably, the method comprises amplifying said electrical signals prior to said driving.

There is also provided in accordance with a preferred embodiment of the invention, a method of determining a time of flight of a pulse between two electronic devices, comprising:

simultaneously generating an acoustic pulse and an electromagnetic pulse using a speaker of a first electronic device;

detecting, using a single detector associated with a second electronic device, both the acoustic pulse and the electromagnetic pulse; and determining a time of flight of said acoustic pulse the two devices based on a delay between the reception of the two pulses.

There is also provided in accordance with a preferred embodiment of the invention, a method of acoustic communication, comprising:

estimating an echo duration for an acoustic band; and transmitting data using the acoustic band, wherein between data elements a period of silence is provided, having a duration responsive to said echo duration. Preferably, the data elements are encoded using individual frequencies in an FSK encoding protocol. Alternatively or additionally, estimating comprises estimating based on an expected communication geometry. Alternatively, estimating comprises estimating a duration based on at least one acoustic calibration generated adjacent to said data transmission.

BRIEF DESCRIPTION OF THE DRAWINGS

The invention will be more clearly understood with reference to the following detailed descriptions of non-limiting preferred embodiments of the invention in which:

FIG. 1 is a schematic illustration of a computer and an electronic device that are operative to communicate using sound waves, in accordance with a preferred embodiment of the invention;

FIG. 2 is a schematic illustration of two communicating electronic devices, in accordance with a preferred embodiment of the invention;

DETAILED DESCRIPTION OF PREFERRED EMBODIMENTS

Figure 3:
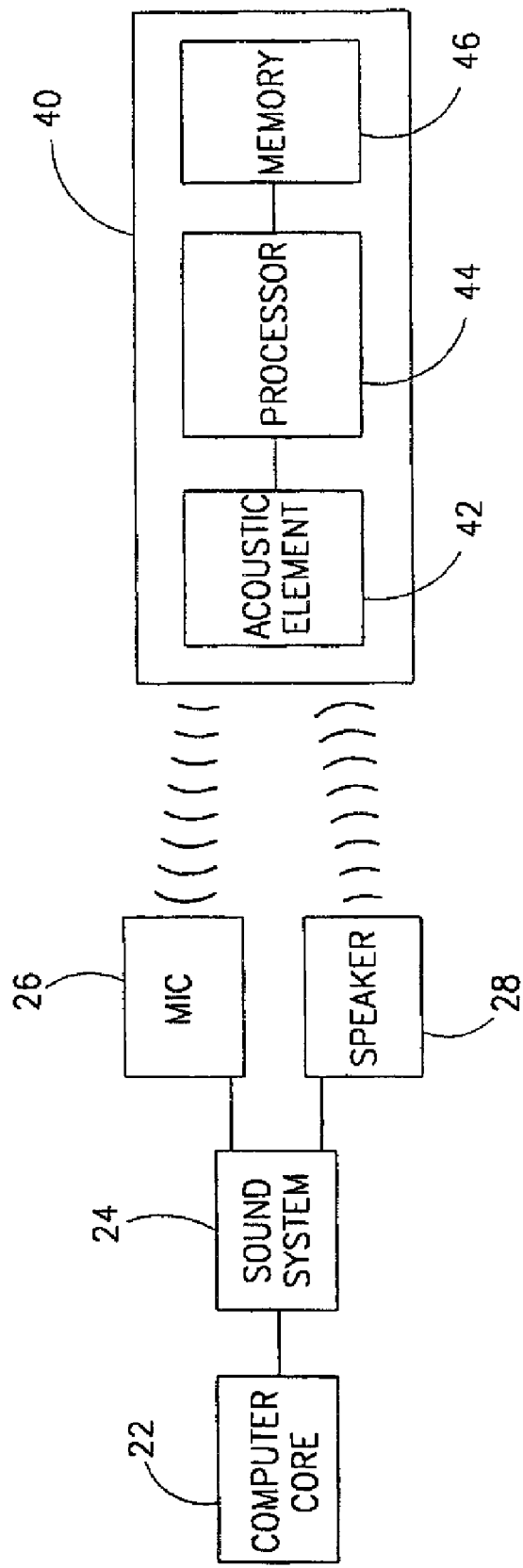
FIG. 3 is a schematic illustration of a smart card communicating with a computer, in accordance with a preferred embodiment of the invention.

FIG. 1 is a schematic illustration of a computer 20 and an electronic device 30, which are operative to communicate using sound waves, in accordance with a preferred embodiment of the invention. Most computers currently on sale include a sound system 24, usually a sound card, connected to at least one microphone 26 and at least one speaker 28. Many electronic devices include a microphone 34 and a speaker 36. In a preferred embodiment of the invention, computer 20 and electronic device 30 communicate using these standard components, which are usually not designed for computer communication but for human communication. In some cases, the electronic device (or the computer) may include a jack to which one or more speakers and one or more microphones may be connected. Preferably, such connected acoustic elements are positioned on a difficult to obstruct portion of the device, preferably at positions where the elements have a wide field of view.

In one preferred embodiment of the invention, a standard sound card, such as the popular "Sound-Blaster" is used to generate sonic and/or ultrasonic signals to (and to receive them from) an electronic device, a toy and/or another object. The acoustic signal may be audible or inaudible, for example having mainly ultrasonic or infrasonic frequencies. Preferably, frequencies of about 22 kHz and 24 kHz and 32 kHz are used, since a standard sound card provides these sampling rates (and/or their multiples, e.g., 44 kHz and 48 kHz). As used herein the term "main frequency" is used to describe the frequency band in which most of the energy of the information carrying signal is concentrated. In some cases, the information carrying portion of the signal is not at the main frequency generated by the card, for example when an ultrasonic signal is overlaid on a different audible sound.

In some preferred embodiments of the invention, a sound card is adapted to work in the near ultrasonic range, for example by increasing its sampling frequency. Generally, the microphone and loudspeaker used for a computer system can support low frequency ultrasound with sufficient fidelity without adaptation. In some cases however, a special ultrasound-sensitive microphone or ultrasound-effective speaker may be used. In other cases, the sensitivity of a particular microphone and/or loudspeaker maybe determined prior to or during communication with an electronic device. In one example, if a device having known characteristics transmits an equally powerful signal at several frequencies, the frequency sensitivity (and/or directional sensitively) of a microphone may be determined. In a similar manner, a computer may generate these sounds and the signals detected by the device analyzed to determine output characteristics of the particular loudspeaker used. In addition, a self-calibration procedure may be performed by listening to the computer's output using the computer's microphone. In some cases, both the device and the computer sound systems can be calibrated by combining self testing and cross-testing.

In some cases, the microphone and/or the sound card are sensitive enough to receive, from the object, an RF signal associated with generating the acoustic signals, even if an acoustic signal is not sent (e.g., no loudspeaker is present). Alternatively or additionally, the object may detect RF signals generated by the speaker or sound card while generating the ultrasound. These RF signals are generally less affected by lack of line of sight than ultrasonic signals. In an exemplary embodiment, a device for communication with a telephone handset (or other devices where the speaker and microphone are displaced), can be made small, by allowing the detection of sounds from the telephone to be emulated by the detection of RF fields from the telephone speaker. Thus, a smart-card can be made small and placed against the telephone microphone and still receive signals from the telephone loudspeaker. Alternatively or additionally, the device may transmit RF fields to generate an electrical signals at the telephone microphone. These transmitted and received signals may be ultrasonic or they may be sonic, for example DTMF or DTMF-like signals as known in the art.

In a preferred embodiment of the invention, such an acoustic communication may be used to program a toy and/or retrieve information from a toy, for example replacing an RF link for this purpose as described in U.S. Pat. No. 5,752,880, the disclosure of which is incorporated herein by reference. In a particular embodiment, music may be downloaded from the Internet, directly to the toy, for example by modulating an ultrasonic signal to carry MP3 sound files. Alternatively or additionally, such a link may be used for real-time communication with the toy.

Some embodiments of the invention do not require that the electronic device communicate with a computer. FIG. 2 is a schematic illustration of two communicating electronic devices 30 and 30'. In one example, a PDA communicates with a printer. In another, an organizer communicates with a satellite telephone. Possibly, such communication is used to exchange data files and/or to share capabilities, such as modem connections. In some cases a port adapter may be required to be plugged into a port, for example a sonic-to-parallel adapter, which converts between acoustic signals and parallel port signals.

A computer network, in accordance with a preferred embodiment of the invention, utilizes sound waves transmitted between computers for communication, using existing hardware, such as an audio card, loudspeakers and a microphone. Preferably, the sound waves are ultrasound waves. In a preferred embodiment of the invention, such a computer network is used to connect a PDA or a portable computer to a different computer, for example for data transfer or for sharing peripherals, such as a modem, a printer or a storage device. Thus, an existing PDA (which includes a loudspeaker and a microphone) can use a modem of a desk-top computer, without requiring additional hardware in the PDA, possibly requiring only a small software change. This software change may be in application software on the PDA or in the operating system software (or both), depending on the implementation. In another example an acoustic-enabled smart-card (such as that described below), can print or backup information using a standard desktop computer. Alternatively or additionally, such a network may be used in a small office, for example for file or printer sharing.

In a preferred embodiment of the invention, a standard communication protocol/language is defined, so that many types of devices can communicate and/or share resources using the standard language. Alternatively, an existing networking language may be used.

In a preferred embodiment of the invention, sonic and/or ultrasonic communication is used for paying a toll or a fee (human, package or vehicle), utilizing a reactive component, possibly a passive transponder, on the tolled item. In another example, such communication is used to pay a transportation fee, for example on a subway or a bus. Alternatively or additionally, an acoustic mechanism as described herein is used to open vehicle barriers, for example at entrances to apartment complexes or to open garage doors. Alternatively or additionally, the acoustic mechanism is used for automatic refueling/billing systems, possibly transmitting billing and/or mileage information to a pump receiver, controlling the fuel flow and/or verifying the fuel type. Possibly, a car dashboard speaker, a car horn, an alarm speaker, a car radio speaker or a dedicated speaker, is used to sound the required sonic and/or ultrasonic signals. In some cases, as noted above, it is the RF signals generated by the speaker which are detected. In a preferred embodiment of the invention, a car radio speaker is made to generate the required sounds by transmitting an electromagnetic wave to the radio or to its loudspeaker, from a specialized electronic device.

Alternatively or additionally, to using a computer, in a preferred embodiment of the invention, a set-top box, of a cable TV system, for example, is used to transmit and/or receive acoustic signals. Preferably, a microphone is connected to the set-top box. Alternatively or additionally, the transmission back to the set-top box uses an IR signal, which is detectable by the set-top box. In one example, the set-top box includes software that analyzes signals. Such signals may comprise responses of electronic devices and/or toys to sounds generated by the television or by the set-top box. Alternatively or additionally, the set-top box adds sounds (or ultrasonic waves) to a video and/or audio stream decompressed by the set-top box. Alternatively or additionally, the set-top box adds temporal and/or spatial optical modulations to a video stream, for an optically-sensitive electronic device to detect.

In a preferred embodiment of the invention, the detection of a signal by an electronic device (or a computer) comprises a binary detection of the signal, e.g., an on/off state. Additionally or alternatively, more complex signal detection and analysis techniques may be implemented, for example, detection of signal amplitude, frequency, frequency spectrum, Doppler shift, change in amplitude and/or duration, detection of a number of repetitions, voice and/or other pattern recognition in the sound. Various information encoding protocols may be used, including AM, FM, PSK, QPSK and/or pulse length encoding. The transmitted signal may include one or more of information about the sending device's activities, location, environment, nearby devices, locally sensed information, logic state, readiness, requests for information and/or answers to such requests.

Such signal detection and/or analysis may also be performed on a computer that is in communication with the electronic device. The physical detection circuit is preferably located on the device. Additionally or alternatively, the detection circuit is also located on the computer.

In a preferred embodiment of the invention, microphone 34 (or microphone 26) comprises a directional microphone, for example a stereophonic microphone or a microphone in which the frequency response is spatially non-uniform, to aid in determining the direction of the sound source or to reduce noise.

PCT application PCT/IL98/00450, titled "The Control of Toys and Devices by Sounds", filed Sep. 16, 1998, in the Israeli receiving office, the disclosure of which is incorporated herein by reference, describes sound actuated toys. In particular, the application describes various sound makers that generate sounds inadvertently as a result of motion, for example beads in a box or noise form a crinkle material. Such a sound maker is connected to and/or mounted on a toy, so that when the toy moves a signal will be generated for another toy or device to acquire. This PCT application also describes detecting the direction and/or position of a sound, using directional microphones and/or a stereophonic microphone including two or more microphone elements. Additionally or alternatively, a relative distance is determined based on amplitude of the sound.

Israel application 127,569, filed Dec. 14, 1998, titled "Interactive Toys", the disclosure of which is incorporated herein by reference, describes various toys and electronic devices which interact using sound waves. These applications contain information useful in the design and use of acoustically controlled devices, and which may be applied towards some preferred embodiments of the invention.

FIG. 3 is a schematic illustration of a smart card 40 that communicates with a computer. Although a smart card is a special case of an electronic device, it is noted that typical smart cards do not include an acoustic input/output channel, especially not an ultrasonic one, in the low ultrasonic frequencies.

In a preferred embodiment of the invention, smart card 40 comprises an acoustic element 42, a processor 44 that controls the acoustic element and a memory 46 for storing information. Such a smart card may use a single piezoelectric transducer (possibly a film layer) for both transmission and reception.

As many electronic devices include a speaker and/or a microphone, such a card may communicate with any such device that has suitable software. Due to the decreasing size of electronics, in some cases, a smart card may be emulated using a PDA or other electronic means (or vice-versa), with regard to both size and functionality. Additionally or alternatively, such smart card functionality may be exhibited by a cellular telephone or a lap top computer. A benefit of a lap top computer and of a PDA is their convenient user-interface. A benefit of a cellular telephone is the possibility of real-time and/or off-line communication with a central location.

A particular desirable use for such a smart card is for authentication, e.g., using a digital signature method, of e-commerce transactions. In such an application, the card may be used to supply encrypted or signed information, to a vendor, over the Internet or over the telephone, by transmitting sound wave to the computer from the sound card. These sound waves can forwarded to the vendor or a verifier as sound files or as data files. The smart card may generate the information responsive to information presented by the computer, either acoustically to the smart card or using a human to enter data into the sound file.

Figure 4:
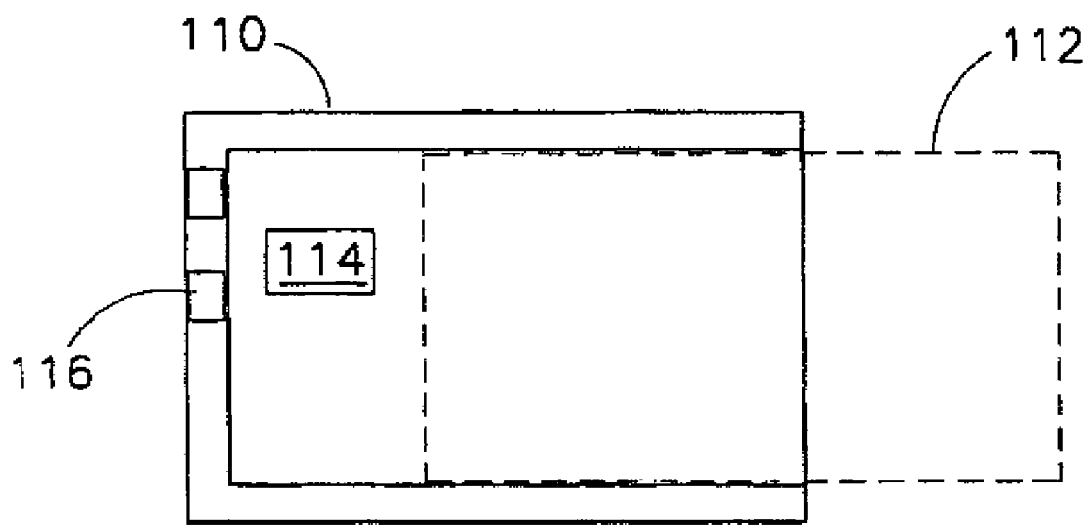
FIG. 4 is a schematic illustration of a smart-card reader in accordance with a preferred embodiment of the invention.

FIG. 4 is a schematic illustration of a smart-card docking station 110 in accordance with a preferred embodiment of the invention. A smart card 112 is inserted into the reader 110. A portion 114 of the reader is configured to communicate with the smart card, for example using RF, magnetic fields, ultrasound, IR and/or any other communication protocols. Possibly, a plurality of such areas 114 are provided, each for a different physical protocol. These communications with the card are preferably transformed, using an acoustic transducer 116, into acoustic communications to be transmitted to—and/or received by—a remote computer or other electronic device, using the methods as described herein. Thus, an owner of a smart card can easily interact with a standard computer without installing a dedicated reader on the computer. Rather, the smart card owner will carry around a miniature adapter 110 that can communicate with a computer in a wireless manner. Alternatively, a smart card may be constructed to have an ultrasonic communication protocol, such that swiping can be performed without requiring a docking station 110.

Alternatively or additionally, docking station 110 is designed specifically for magnetic cards, such as common credit cards. Station 110 preferably includes a sensitive magnetic field detector in area 114, so that when a card is inserted into the docking station, the magnetic strip is read. Consequently, it becomes possible to swipe a standard magnetic card at many existing electronic devices, without requiring special hardware to be connected. A dedicated station may be made very thin, for example less than 10 mm or even less than 5 mm. Preferably the docking station has a closed configuration, but an open docking station, comprising a sensor and a contra to hold the card against the sensor is also envisioned. Although card swiping is a one-way communication process, in some cases two way communication may be desirable, for example for a user to collect information regarding purchases for example amounts, times, type and authentication confirmation. In some embodiments, this information may be accumulated by the station 110, as described below.

Alternatively or additionally, station 110 may be adapted to attach to a port of a PDA, cellular telephone, "organizer" or other portable electronic devices. Such a station converts electronic signals at the port to sonic and/or ultrasonic acoustic signals that can be recognized by a computer.

A dedicated station may be manufactured for each device and smart card type. Alternatively, a single station may be constructed for multiple device types and include an auto-sensing circuit for detecting the logic of the output port. One example of such a detection is by "transmitting" a known signal from the device and determining the setting which allows the station to detect that signal. Another example of automatic detection is by automatically recognizing characteristics of the device, such as transmission amplitude or geometry. Alternatively, station 110 may include a switch or other user interface for manually selecting between different types of electronic devices.

It should be noted that although acoustic communication is preferred for at least one communication direction (computer to smart-card or smart-card computer) one or both of the communication directions may utilize other technologies, temporarily or on a permanent basis. For example, the card may use the IRDA IR communications standard or the Bluetooth RE communications standard. Alternatively, one of the directions may be manual, for example a device displaying to a user what he should enter into the other device.

In some embodiments of the invention, station 110 may enhance the functionality of a device or a magnetic card, possibly elevating its functionality to that of a smart card, or enhancing the functionality of a less versatile smart card. For example, station 110 may provide authentication of vendor, by decoding an encrypted signal transmitted by the vendor (which a magnetic card is unable to read and/or process). In another example, station 110 may comprise a memory for tracking the use of a magnetic card. In another example, station 100 may provide positioning capabilities.

In a preferred embodiment of the invention, spatial angles between a sound source and a plurality of microphones are determined by analyzing phase differences at the microphones. Alternatively or additionally, other methods known in the art may be used for positioning. In a preferred embodiment of the invention, a relative location of a pulsing sound source and a plurality of microphones is determined by solving time of flight equations. Thus, the relative location of an electronic device and/or a computer, relative to another electronic device or smart card, may be determined and used to control the operation and/or cooperation of one of the above electronic devices.

In a preferred embodiment of the invention, four microphones are used to determine a three-dimensional position. For a source at $r=(x_0,y_0,z_0)$ and a plurality "i" of microphones at $M_i=(x_i,y_i,z_i)$, the distances between the source and the microphones are $D_i=\|r-M_i\|$. The acoustic velocity, "c", may be known, for example based on a known velocity in air. Alternatively, it may be determined by measuring the time of flight between a sound source and a microphone having fixed and known relative locations. A difference between distances is preferably defined as $dD(i,j)=Di-Dj=c*dt(i,j)$, where $dt(i,j)$ is defined as a difference between time of arrival at microphone i and time of arrival at microphone j. For N microphones there are N−1 independent differences dD. In an optimal configuration, the four microphones located at vertexes of a tetrahedron may be used to determine the location of a source. From practical considerations, such an arrangement may not be possible. Preferably, more than four microphones are used, so that a higher resistance to noise and/or a higher localization precision may be achieved. In a preferred embodiment of the invention, the three dimensional position is determined by numerically or analytically solving three equations of the form:

$dD=c*dt(i,j)=\|r-M_i\|-\|r-M_j\|$, where (i,j) is preferably selected to be (1,2), (2,3) and (3,4). However any other independent three pairs of microphones may be used. In some cases it is useful if one of the electronic devices operates as a transponder, which receives signals and sends back a signal indicative of the received signal and/or its time of flight.

In some embodiments of the invention, the above positioning method may be applied using passive tags on the object whose position is to be detected. In a preferred embodiment of the invention, such tags are powered by the computer speaker, using an RF field generated by the speaker. Alternatively, other RF-generating computer components may be used. this powering may be used to allow the tags to be responsive. Alternatively, this powering may be used for other uses. Alternatively, the powering may be by using a standard smart-cart RF-coupling peripheral.

Position determination may be based on transponding signals which impinge on objects. Alternatively, an object may transmit a signal which encodes the time of arrival of the interrogating signal. Thus, the accuracy of positioning can be higher than the frequency of the interrogation signal, assuming the object has a clock with a higher resolution than the frequency of the interrogation signal.

A touch screen in accordance with a preferred embodiment of the invention utilizes acoustic transmission to detect the location of a touch implement, such as a pen. In a preferred embodiment of the invention, the position of the pen is determined using one or more microphones and/or speakers mounted on the pen, which transmit and/or receive signals from a computer and/or other speaker and/or microphone controller. Possibly, a three-dimensional position of the touch implement is determined using four acoustic elements, such as two microphones and two speakers. It is noted that a computer typically includes a modem speaker, an internal speaker and/or optionally a keyboard speaker, as well as sound-card speakers. Lately, however, the internal speaker is not provided in standard installations. In addition, some computers include an ultrasonic pointing device or other ultrasonic ports. In a preferred embodiment of the invention, the smart card can communicate using this ultrasonic communication port.

A more basic type of position detection may be based on detecting an interruption by an object of an ultrasonic beam between a speaker and a microphone.

Alternatively or additionally to position detection using a responsive object, a radar-type position or distance detection may be used, in which a microphone of a computer detects the reflection of ultrasonic waves from an object, which waves are generated by a computer speaker. By detecting only relative differences between reflections from different objects, the relative distances of the objects can be determined without knowing the exact location of the sound source.

In some preferred embodiments of the invention, the microphone detects both an acoustic pulse and an electromagnetic pulse generated as a side effect of producing the acoustic pulse. As the electromagnetic pulse is substantially simultaneous it may be used as a clock or as a reference time for determining the time of flight of the acoustic pulse. Additionally, since a transponder microphone may detect both kinds of pulses, it is possible to determine the component times of flight to a transponder and not just the sum time of flight, using a retransmission of the detected signals by the transponder.

In a preferred embodiment of the invention, location methods utilize a calibration process, in which the located implement is placed at one or more known location, so that it is possible to correct for the location of the speaker(s) and the microphone(s)/Alternatively or additionally, the calibration procedure is used to correct for propagation times (of the acoustic waves and/or of electronic signals which generate sounds) and/or for reflections, wavelength dependent attenuation and/or broadband attenuation.

A different type of touch screen, in accordance with a preferred embodiment of the invention, detects the location of a touch implement based on the detection and position determination (2D or 3D) of sounds generated when the touch implement touches the "touch sensitive" surface. This surface may be coated with a sound generating material, such as crinkle-paper, to provide a distinctive sound.

In a preferred embodiment of the invention, for example as described above, an interrogated object receives the ultrasound signal and sends it back to a microphone of the computer. In a preferred embodiment of the invention, the computer analyses the time of flight and/or other attributes of the transmission and determines a distance from, position to, velocity of motion and/or other spatial attributes of the object. In some cases, a plurality of sources or receivers may be placed on the object, to assist in determining angular motion of the object. Alternatively or additionally, Doppler analysis of the response may be used to detect changes in distance. Alternatively or additionally, changes in distance are detected by comparing two consecutive measured distances. The plurality of sources may be differentiated, for example, by timing of signal generation, frequency band used and/or encoding of the transmitted signal.

In a preferred embodiment of the invention, the object responds immediately to the interrogation signal. Alternatively, the object delays its response to an interrogation signal, for example for a few milliseconds. Alternatively or additionally, the object transmits at a different frequency from the received frequency, for example at 24 kHz in response to a 20 kHz query. Alternatively or additionally, the signal transmitted by the object is received by a transducer which then transmits the signal to the computer, for example acoustically or using electromagnetic coupling. Alternatively or additionally, the object may respond with an identification code. Alternatively or additionally, the object modulates its transmission with an envelope, which envelope preferable serves as an identification code and/or for transmission of information regarding a status of the object, for example a position of an arm of a toy. In some cases, the object relays information from a more remote object. In the case of identification, the object may send an ID code even without prompting from the computer, for example periodically or by a user pressing a button on the object (or by flexing the object).

In a preferred embodiment of the invention, the object amplifies the signal it receives using a discharge of a coil through a transistor, where the transistor serves as a variable resistor and/or as a wave-form controller.

In some preferred embodiments of the invention, the generated sounds are transmitted indirectly via an existing network. One example of a suitable network is a telephone network, preferably a digital network, with the sounds being forwarded from one telephone to another. Another example of a suitable network is an intercom system. Another example of a suitable network is a LAN or an Internet. Additionally, as described below, the ultrasonic waves may be transmitted (as acoustics, not electromagnetic) over wiring, such as electrical wiring or over pipes, such as water and gas pipes.

In a preferred embodiment of the invention, a wireless telephone system uses handsets which communicate with base stations, for example computers or telephones, using ultrasonic communication, as described herein. In a preferred embodiment of the invention, an office telephone or computer network can serve as a local cellular network for communication, by keeping track of which base-stations are in communication with which handsets and by providing the ability for a base station to locate handsets and for a handset to change base stations.

In many situations, there will be more than one active smart card (or other electronic device using ultrasonic waves for communication) in a region at a single time. In a preferred embodiment of the invention, the different devices coordinate so that they do not both transmit at a same time. In one example, a central computer assigns time, frequency or coding (CDMA) slots. In another example, an ALOHA algorithm is used to avoid collisions.

Figure 5:
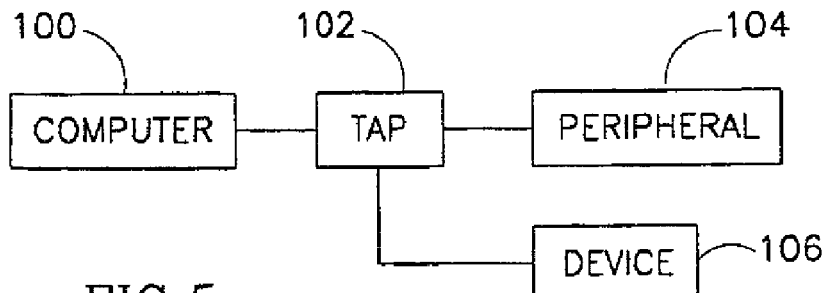
FIG. 5 is a schematic illustration of a method of tapping into a computer, without requiring complicated installation of hardware, in accordance with a preferred embodiment of the invention.

Some embodiments of the present invention contemplate other methods of communication with a computer (or other devices) without installing hardware. FIG. 5 is a schematic block diagram of a communications tap 102 for a computer 100, in accordance with a preferred embodiment of the invention. In the configuration of FIG. 5, a tap is preferably placed on communication line to an existing peripheral 104. Thus, a user may not be required to even access a back part of a computer, let alone a computer's internal workings. An electronic device 106, a toy and/or a smart-card preferably send and/or receive signals from tap 102. Additionally or alternatively, device 106 may use one tap for receiving and one for sending. Possibly, a device uses taps only for one direction of communication.

In a preferred embodiment of the invention, the tap is placed on a cable to a printer, a network cable, a camera cable and/or a SCSI connection. Additionally or alternatively, the tap is placed on a serial cable, for example a mouse cable. Additionally or alternatively, the tap is placed on a modem line, for example on a telephone line or by plugging the tap into another telephone socket, to be received by the modem. Additionally or alternatively, the tap is placed on a game controller line. Additionally or alternatively, the tap is placed on a loudspeaker line. This type of tap can detect signals that cannot be reproduced by the loudspeaker, for example very high frequencies, for example higher than 50 kHz. Additionally or alternatively, the tap is placed on a microphone line, possibly using the microphone line and/or the microphone itself as a sonic, ultrasonic or non-acoustic antenna (e.g., RF). Additionally or alternatively, the tap is placed on a display cable line.

In a preferred embodiment of the invention, the tap includes an electro-magnetic coupler, which can induce signals in a cable that passes through or near the tap. Additionally or alternatively, the tap can detect signals in the line and transmit them to device 106. In a preferred embodiment of the invention, the signals are at a different carrier frequency and/or signal frequency than the usual signals passed along the line. Additionally or alternatively, the signals travel in an opposite direction (input signals on an output line, such as a printer or output signals on an input line, such as a mouse). Additionally or alternatively, the signals encode information which information is detected and removed from the data stream in the computer. Additionally or alternatively, the signals are asynchronic on a synchronic line. Additionally or alternatively, the signals are transmitted only when no signal is expected by the computer and/or the peripheral.

In an alternative embodiment of the invention, a piezoelectric actuator (or other vibrating element) is connected to a mouse (or a microphone). The actuator causes the mouse to shake at an amplitude of one or two screen pixels (or less) and the shaking is detected by software in the computer as signals from the toy. A return signal may be transmitted to a tap associated with the actuator, along the serial cable, with the signal preferably being coded to be recognized by the tap and/or ignored by the mouse.

In an alternative embodiment of the invention, device 106 sends signals to computer 102 using a tap which actuates keys on a keyboard attached to computer 100. Such actuation may be, for example, mechanical or magnetic (e.g., on magnetic switched keyboards). Preferably the key used is a shift key. Additionally or alternatively, signals from the computer are detected by detecting illumination of LEDs on the keyboard, for example a "Num Lock" LED.

Alternatively or additionally, the tap detects illumination of other LEDs on a computer, for example power, sleep, CD-ROM and/or hard disk LEDs. Alternatively or additionally, the tap detects information transmitted via noise or vibration generated by activation and/or modulation of the activity of mechanical components of the computer, for example diskette drives, disk drives and CD-ROM drives. Alternatively or additionally, the tap detects an electromagnetic signal generated by power surges to the devices, for example a CD-ROM when it is powered or variations in RF amplitude and/or frequency of the CPU, for example those caused by entering a sleep mode.

In a preferred embodiment of the invention, a tap "learns" the electromagnetic and/or acoustic profile of a particular computer or portion thereof and learns the effects of various commands on this profile. When a computer desires to communicate with a tap, it preferably modifies the profile using those commands which are determined to have the greatest, most noticeable and/or fastest effect on the profile.

Additionally or alternatively, device 106 utilizes a transducer which plugs into a parallel port, a serial port and/or is optically coupled or placed near an IR port. Preferably, the transducer is a pass-through transducer, through which a printer and/or other peripherals may communicate normally with a computer. This transducer can then transmit the signals by wired or wireless methods to a remote device.

In a preferred embodiment of the invention, the tap and/or transducer can automatically detect which type of cable is tapped/port is connected to. Such a tap preferably includes a microprocessor or an integrated circuit to analyze signals on the cable, rather than solely a transducer for coupling signals to and from the cable. Preferably, such detection is by analyzing amplitude, frequency and/or synchronization of signals passing through the lines. Additionally or alternatively, the computer detects which line is tapped, by detecting particular inferences on that line. Alternatively or additionally, software on the computer sends test signals along the lines, to be detected by the tap. Possibly, the tap can detect the signals even without being programmed with the type of line on which the signals are transmitted. Alternatively, when a tap is used, a configuration program is run so that a user can define to the tap and/or the computer what is being tapped.

In a preferred embodiment of the invention, a smart card directly taps the computer, for example using a RF antenna embedded in the smart card to detect signals being transmitted over data lines, e.g., to a peripheral or another computer or for the use of the smart card.

In an exemplary embodiment of a device using tapping, a pass-through hasp is provided, which is connected to a port. In a preferred embodiment of the invention, the hasp uses power from the power lines but does not interact with data flowing through the port. Authentication of software using the hasp preferably utilizes acoustic communication between the hasp and the computer's microphone and/or speaker. Alternatively, the hasp may interact with signals that flow through the port, which signals are not suitable for use as data, for example the signals using a wrong protocol, having an incorrect CRC, being asynchronous in a synchronous connection or having an incorrect frequency. Such a hasp may also be used to protect an easily stolen device, such as a PDA or a laptop computer, which can use their internal speakers and/or microphones to detect the proximity of a required ID tag. If the ID tag is not detected the device can fail to work, work incorrectly or it can report that it is stolen.

In a preferred embodiment of the invention, suitable software is installed on computer 100. Preferably, the software is self installing. Preferably, the computer is not used for any other use while device 106 is communicating with it. Additionally or alternatively, the software can differentiate between "regular" signals and signals related to the tap. In one example, a provided keyboard driver may detected special codes and/or data sequences on the keyboard line and remove them from the received data, passing only the rest of the received data to an operating system of computer 100. Additionally or alternatively, a provided mouse driver may detect spurious and/or small mouse movements, and recognize them as being tap-related signals, as described above. Additionally or alternatively, a printer driver can recognize data on the cable as not coming from the printer but from a tap. Additionally or alternatively, data sent to the tap is preferably sent as data which will be rejected or ignored by the peripheral, for example having incorrect parity settings or other intentional errors. Alternatively or additionally to using a tap for communication with a toy, such a tap may be used to attach a peripheral to computer 100. As indicated above, the tap may include a processing element so that the signals coupled to the cables do not interfere with the normal operation of the cable, for example being transmitted when there are no others signals on the cable. Alternatively, such processing may be performed by a device which uses the tap.

In a preferred embodiment of the invention, the signal received on the computer is used to modify an executing program and/or to generate commands to other electronic device, preferably using sounds generated by the computer but possibly using a dedicated connection. In an exemplary application, a computer game in which a computer display responds to external sounds, such as bowling pins falling, is provided.

The acoustic communication may also be used to communicate between an input device and a computer program, for example between a wireless keyboard or mouse and a computer. In another example, a light-pen transmits to the playstation a signal responsive to pixel intensities which are detected by a photo-detector thereon. Alternatively or additionally, a synchronization signal is transmitted from a computer and/or a set-top box to the pen, to synchronize the pixel detection with the TV raster scan. These transmissions may be additional to—or alternative to—transmission of position and/or orientation. Alternatively or additionally, the input device transmits the status of controls thereon. Alternatively or additionally, the transmission is used to transmit information to be displayed on an output device or an output portion of the input device, for example to light up lights thereon and/or drive text and/or graphics displays thereon.

Figure 6:
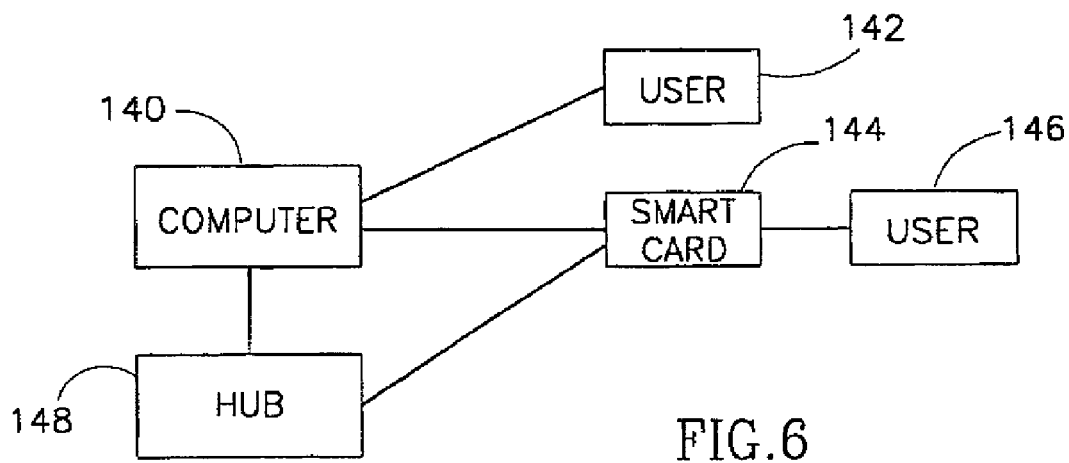
FIG. 6 is a schematic illustration of an unobtrusive computer checkup in accordance with a preferred embodiment of the invention.

FIG. 6 is a schematic illustration of an unobtrusive computer checkup in accordance with a preferred embodiment of the invention. A user 142 is using a computer 140. A user 146 wishes to interrogate computer 140, for example to analyze a networking problem. In a preferred embodiment of the invention, a smart card 144 (or other electronic device) can communicate with computer 140 using an acoustical—or a tap—channel as described above, without interfering with the activities of user 142. Alternatively or additionally, smart card 144 may be used to interrogate an interface-less device, such as a hub 148. One advantage of acoustical communication for these uses is that they do not generate a considerable amount of RF interference and do not require major (if any) changes in a (significant) install base of hardware. In a preferred embodiment of the invention, hardware devices, such as hub 148 and computer 140 continuously "hum" their status, in RF or in acoustics, so that the status can be discerned by eavesdropping on the hum, without needing to interrogate the hardware.

A card such as card 144 may also be used to give privileges to it's owner in the form of better service (e.g., priority at a file server, speed of connection to the Internet) and/or alleviate various security restrictions. For example, a manager can come to his employee desk, activates his card and previously unreachable files become available. It is noted that this process of changing the behavior of a computer does not require logging on to the computer (although such log-on is possible). Rather, the computer recognizes the manager even while it remains logged on to the other user.

In a preferred embodiment of the invention, when the card or other device is used for logging-on, a hysteresis-type logic is used, in which logging on requires a high quality definite signal, while logging-off (possibly automatic log-off) is delayed until there is substantially no contact with the card. The lack of contact can be detected by the lack of detection of a periodic signal generated by the card. Thus, once logging on is achieved, maintaining the contact does not require a high quality connection.

Figure 7:
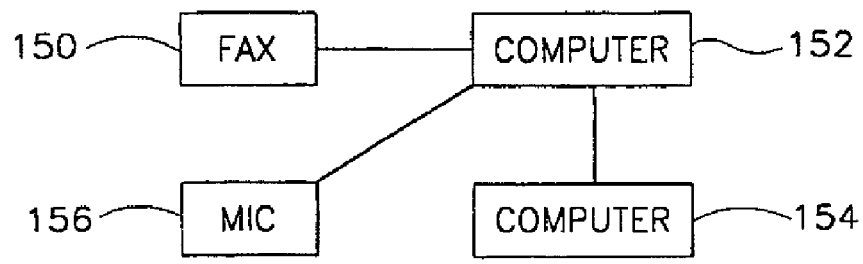
FIG. 7 is a schematic illustration of a computer communication setup using acoustics, in accordance with a preferred embodiment of the invention.

FIG. 7 is a schematic illustration of a computer communication setup using acoustics, in accordance with a preferred embodiment of the invention. A computer 152 includes a microphone 156 that is used for detecting activity sounds of other electronic and/or mechanical devices. The activity sounds may comprise natural sounds, for example a page sorter being used in a photocopier. Alternatively or additionally, they may comprises indicator sounds, for example a beep generated by a fax machine 150 when a fax comes in. Fax machine 150 may be connected to a computer (as shown) or it may be unconnected. Alternatively or additionally, they may comprise artificial sounds, for example a special information carrying sound generated specifically for the benefit of computer 152.

In a preferred embodiment of the invention, a computer 152 transmits indications of the sensed activities to a remote computer, such as computer 154. Thus, a user at computer 154 can be informed of a fax coming in or of an unanswered telephone call even if he is in a different room and the fax machine is not connected to a standard computer network.

Alternatively or additionally, the analysis of sounds detected by microphone 156 can be used to determine other occurrences at computer 152. In one example, microphone 156 can be used to log the habits of a user, including, telephone conversations, numbers dialed (by detecting the DTMF sounds), sounds of papers being shuffled, breathing sounds, snoring of a sleeping user, average number of rings until a call is answered, and typing habits. Alternatively or additionally, microphone 156 can be used to detect an occupancy of a room or glass breakage, possibly serving as a burglar alarm.

Alternatively or additionally, the microphone may be used to detect electromagnetic impulses generated by operating devices. Typically, each device has a different electromagnetic signature. Different signatures may be generated when the device is switched on or off, when the device is operated and/or for different modes of operation. Thus, a computer-microphone combination can be used to detect the operation of devices, such as photocopies, door chimes and computers. In a preferred embodiment of the invention, a video input card is used to analyze higher frequencies of electromagnetic radiation than those detectable by a microphone-sound card combination. It can thus be appreciated that noise signals which are usually rejected by signal processing algorithms may be analyzed to detect important information of activities in the vicinity of the microphone.

In an exemplary device which communicates with a computer using ultrasound, input/output filtration circuits are provided. These filtration circuits preferably comprise op-amplifiers with filters for specific frequencies for input and output, dependent on the communication protocol used. If non-audible frequencies are used, the filters should preferably decrease or block power at audible frequencies, to reduce annoyance of a user.

The communication protocol is preferably a digital binary code in which the bits are transmitted using Frequency Modulation, Pulse Width Modulation, On-Off Keying and/or any combination of the above. Error correction codes, for example parity, Gray or Hamming codes, as known in the art may be used. It should be noted that the range of available frequencies may be limited if ultrasonic frequencies are used, due to degraded capabilities of the computer sound card.

In a reception process, the signals received by the device are convert them to data bits, either by time domain analysis or by Fourier analysis. Thereafter, error checking is preferably performed. The received information may be decrypted (if necessary). Alternatively or additionally, the received information may be encrypted, verified and/or signed, in order to be stored in local memory. The local memory may comprise ROM, RAM, EPROM, EPROM and/or other types of memory as known in the art. Information to be transmitted may be encrypted before transmission.

The software on the computer receives a detected signal, filters it, and opens the protocol. Preferably, the software reduces noise using IIR band pass and/or low pass filters.

The received and filtered signal is then demodulated, into data bits, for example, by time domain analysis or by Fourier analysis. Data transmission errors are preferably corrected. The data may then be locally analyzed and/or transmitted to a remote location, for example a seller's computer. In some embodiments, this software is written in an Internet Language, such as Java or ActiveX.

In a preferred embodiment of the invention, the acoustical detection uses the maximum resolution and/or sensitivity afforded by the microphone, i.e., going below the noise threshold as defined for audio uses. Alternatively or additionally, repeating and/or periodic ambient sounds are detected and removed or disregarded from the input signal. In a preferred embodiment of the invention, ambient sounds are characterized as such during a calibration step which may be performed periodically.

In some cases one or more of the following problems may be encountered, including: echoes, interference (acoustic or electromagnetic), and, at higher frequencies (>10 kHz), problems of directionality and weak reception. In addition, many microphones and speakers behave badly or in an unstable manner at these frequencies. It is noted, that by detecting RF rather than acoustic signals, acoustic interference is reduced and/or the reception may be less sensitive to range and directionality. In a preferred embodiment of the invention, the received sound signals are processed using known signal processing techniques, such as filtration, equalization and echo cancellation. Preferred modulation methods used include PWM, FSK, QPSK and on-off keying. Preferred frequency band types include a single band, a wide band spread-spectrum and frequency hopping bands. Preferred protocols utilize one or more of start-stop synchronization bits, and constant and/or variable length messages. Possibly the device and/or the computer include logic for determining the exact frequency used for transmission, for example to correct for frequency hopping, for frequency shifts caused by inaccurate manufacture and/or for environmental effects. Error detection methods may be used, for example, CRC (preferably 32 bit), Parity, Checksum, Blowfish, Hamming Codes, Retransmit/BCD Codes and Gray codes.

In a preferred embodiment of the invention, periods of silence are provided between data bits in protocols other than on-off keying. In one example, an FSK protocol is provided with silence between the frequency pulses. Preferably, the duration of the silence is sufficient so that echoes (or other artifacts) from the original pulse do not overlap with a next pulse. This period may be fixed, for example based on an expected geometry of the electronic devices and where they are used. Alternatively, the protocol may be adapted based on the instant echo situation. Alternatively or additionally, the pulse duration may be modified to overcome noise, echo and/or other transmission problems. In a preferred embodiment of the invention, a few calibration pulses are first sent to determine a desired silence and/or pulse duration. Possibly, different such durations are used for the two communication directions.

A feature of some embodiments of the invention is that a device can communicate with another device or computer over medium distances, such as 0.3-20 meters, more preferably, 2-10 or about 7 meters.

Several variations on the reception at the computer (or other electronic device) may be practiced according to some preferred embodiments of the invention, including: (a) using a regular microphone and sound card; (b) using a regular sound card but with a special microphone (e.g., one that can be tuned to specific, even ultrasonic, frequencies); (c) using a speaker that can also be a microphone (one possibility is described in detail below); (d) using a microphone/receiver that connects to a dedicated channel such as an RS232 or parallel port, and that can optionally obtain power from the port; and (e) using a built in dedicated hardware port that can be implemented on the computer board.

Several variations on the transmission from a computer (or other electronic device) can also be practiced, including: (a) using one or two speakers, powered alternatively or possibly powered together, for example to increase the total power, to aid in noise cancellation and/or to aid in detecting echoes; (b) using an acoustic transducer connected to a standard port or possibly tapping the computer, as described above; thus, there may be no need for a sound card in the computer; and (c) as suggested above, at small distances there appears to be an overlap between acoustic and electromagnetic signals both with regard to transmission and with regard to reception. Thus, possibly some of the signals are transmitted and/or detected using RF antenna, or acoustic signal generation is detected using an acoustic antenna (or RF antenna) that detects the RF signature of the transmission. Alternatively or additionally, the RF is used as a backup for the acoustic channel.

In some cases, for example if the receiver has a reduced computing capacity, the incoming audio stream is sampled at lower than the carrier frequency. However, a side effect of such sub-sampling, especially when there are no anti-aliasing filters, is that there may be confusion between audible and ultrasonic sounds. Thus, more complex processing may be required to assure that the data transmission is acceptable. In one example, synchronous detection or a more robust error detection method is used. Alternatively or additionally, a specialized waveform with unique time/spectrum characteristics is used, for example one that repeats itself at both 1 and 4 kHz after the down-sampling. Thus, it can be better differentiated from the background.

In many cases, a speaker is available for a computer but a microphone is not. In a preferred embodiment of the invention, a speaker is used as a microphone. Preferably, the speaker is connected to the microphone port and/or line in port of a sound card, possibly through an adapting unit. Apparently, many speakers can operate as a microphone if they are not connected to a power source. Preferably, an adapting unit is provided, for example to serve for buffering, switching (between microphone and speaker functions) and/or for amplitude protection. In some embodiments the adapting unit periodically checks for an incoming signal from outside the speaker or for a signal from the speaker channel. Alternatively or additionally, the computer may generate a special signal via the speaker channel or possibly an audible signal to indicate that a mode switching is desired. In one embodiment, the speaker is connected in parallel to both microphone and loudspeaker channels, with electronic protection for the microphone so that the power to the speaker does not harm the channel.

Alternatively or additionally, some microphone types may be used as both a microphone and a speaker, if they are suitably driven. Possibly, a coupler is provided for driving the microphone using the speaker channel and/or for automatically switching the microphone between modes based on the detection of an incoming signal or possibly periodically.

In some embodiments, the coupling device can split the frequencies between the microphone and speaker functions, allowing a single element to operate simultaneously as a speaker and a microphone. For example, low frequencies are used for the speaker and high frequencies are used for the microphone. When a high frequency is detected by the coupler, it is passed to the microphone channel, when a low frequency is detected it is sounded on the speaker.

Another aspect of the invention relates to transmitting acoustic signals on solid cables, rather than in the air. Such cables can include computer, communication and telephone cables, as well as electric power cables, for example inside a house. In a preferred embodiment of the invention, the transmission along these cables is conducted to a microphone of the device, to which it is directed, where the transmission is analyzed. Alternatively or additionally, transmission is via the box of the device and into the cable. Alternatively or additionally, a dedicated coupler to the cable is provided for one or both of the transmission and reception.

It is noted that a standard house is filled with this infrastructure in the form of power supply, water pipes, telephone lines, and cables. The ultrasonic receiver/transmitter device is simple low-cost and can be very small. The method can be used to achieve communication for low cost appliances, or to achieve a higher bandwidth of information. The method permits multiple appliances talking together, broadcast of information and a network of smart appliances. It can be used to communicate also between computers, televisions and/or VCRs. Every device can have its own id-number and a computer can control the operation of these devices. For some devices a dedicated controller is required, which receives the acoustic signal and, responsive to it, controls the device. Exemplary uses include ordering shutting off or lighting lights at certain time (by computer control) or from outside of home (by telephone or network to the computer) and ordering the VCR and/or television to cooperate in recording a specific TV program, again preferably under computer control.

In a preferred embodiment of the invention, a reader-type input device can read external static (as opposed to sound waves and temporal patterns) information, which information can be forwarded to an associated computer or another device. Such an input device may also be integrated with a smart-card. A simplest example is a wireless bar-code reader that reads bar codes and transmits them acoustically to a computer, preferably using methods as described herein. Preferably, the bar-code reading capability is embodied in a smart card, so that a multifunction device is provided. Alternatively, a miniature device, such a ring, is manufactured, for convenience or a user. Such a device may be useful during purchasing, to allow a user to review large and/or personalized information regarding a product. Another example is a magnetic strip reader which transmits read magnetic strips to the computer. In the case of a magnetic strip reader, a single magnetic sensor (or line sensor) may be sufficient, with the computer processing the detected signals to correct for non-constant motion of the sensor over the magnetic material.

In one exemplary use, when the input device reads a tag, such a code or a description of a device, an associated computer switches to a WWW page which displays details associated with the read information. The computer may be a hand-held computer or PDA. Alternatively, the computer is a standing or store provided computer. Alternatively, the computer is on another side of a telephone line, which acoustic signals are transmitted over the telephone line to the computer, to cause certain speech to be transmitted back. Alternatively or additionally, such tags may be used for technical support (e.g., each home device or component has such a code and there is a help file or scripts associated with the code). Alternatively or additionally, such tags may be used for customer relations, for example to provide information to an interested user. In some types of products, the computer and/ or the tag reader can control the product using information read for the tag. An exemplary situation is a computer device, on which a tag reader or a same or second computer can execute a diagnostic program responsive to the read tag.

An exemplary device consists of an acoustical transmitter, a tag-reading element, and some control logic. The type of tag reading element used depends on the type of tag, for example, if it is optical or magnetic. The tag itself may include bar codes, other optical coding or even text. In a magnetic example, the tag may comprise magnetic ink. Preferably, but not essentially, the tags are of a type that can be printed using standard printers and/or inks. Thus, tags can be printed all over a book, magazine or other printed products. Alternatively or additionally, RE transponder tags as known in the art may be used. In some embodiments, the read information is deciphered by the reader. In other embodiments, partially or completely unanalyzed information is transmitted to the computer for analysis.

Although an acoustic transmission of the tag information is preferred, RF transmission may also be practiced.

In the above description, a large number of permutations and possible embodiments have been described. This type of description is utilized for the case of describing the many different possible embodiments of the invention. It is appreciated by the inventors that some of the described combinations may be known in the art. This is not to be construed as an admission of equivalence of the different embodiments described. Moreover, even such combinations which may be known may find patentable utility from their application in particular situations.

The present invention has been described in terms of preferred, non-limiting embodiments thereof. It should be understood that features described with respect to one embodiment may be used with other embodiments and that not all embodiments of the invention have all of the features shown in a particular figure. In particular, the scope of the claimed invention is not limited by the preferred embodiments but by the following claims. Section titles, where they appear, are not to be construed in limiting subject matter described therein, rather section titles are meant only as an aid in browsing this specification. When used in the following claims, the terms "comprises", "comprising", "includes", "including" or the like means "including but not limited to".

The invention claimed is:

1. A method of determining a status of an electronic device, comprising:
   determining by the electronic device an operating status thereof;
   transmitting the operating status by the electronic device by modulating an acoustic signal;
   receiving by a computer information-encoding acoustic signals generated by the electronic device;
   analyzing said acoustic signals, automatically by the computer, to determine the status associated with said electronic device responsive to said information, wherein said status is indicative of a characteristic of said electronic device encoded in said acoustic signals; and
   transmitting by the computer a signal indicative of said status.

2. A method according to claim 1, wherein said status comprises a status of a second device attached by computer communications with said electronic device.

3. A method according to claim 2, wherein said status comprises at least one of:
   activity of said electronic device;
   activities of a page sorter in a photocopier, a fax machine, a computer, a telephone, a keyboard;
   activities and environment of said electronic device, said environment including occupancy of the room in which the electronic device is located, electromagnetic impulses generated within the room, and electromagnetic radiation in the room.

4. A method according to claim 3, wherein said status is determined by detecting by the computer at least one of activity sounds of said electronic device, indicator sounds of said electronic device, and electromagnetic impulses generated by said electronic device.

5. A method according to claim 3, wherein said status is determined by detecting sounds emanating from a user.

6. A method according to claim 2, wherein said status includes spatial angles between said electronic device and said second device.

7. A method according to claim 2, wherein said status is a location of said electronic device relative to said second device.

8. A method according to claim 1, wherein said acoustic signals are directly transmitted.

9. A method according to claim 1, wherein said acoustic signals are transmitted via electronic means.

10. A method according to claim 1, wherein said status is a three dimensional position of said electronic device.

11. A method according to claim 1, wherein said acoustic signals are transmitted from said electronic device via a tap to said computer.

12. A method according to claim 11, wherein said tap detects signals in the range of higher than 50 kHz.

13. A method according to claim 11, wherein said tap sending signals to said computer, detects activities at said computer and said electronic device.

14. A method according to claim 1, further comprising providing a tap for receiving said acoustic signals at said electronic device.

15. A method according to claim 1, wherein said electronic device comprises a smart card and said smart card detects signals transmitted by said computer.

16. A method according to claim 1, wherein said acoustic signal has a main frequency which is human audible, and infrasonic.

17. A method according to claim 1, wherein said information is encoded on the acoustic signal using below human-threshold amplitudes.

18. A method according to claim 1, wherein said information is encoded on the acoustic signal using below human-threshold amplitude variations.

19. A method according to claim 1, wherein said acoustic signals are transmitted using a communication protocol having a digital binary code in which the bits are transmitted using at least one method selected from the group consisting of Frequency Modulation, Pulse Width Modulation, and On-Off Keying.

20. A method according to claim 1, wherein said acoustic signals are transmitted from said electronic device to said computer over a distance of from 0.3 to 20 meters.

21. A method according to claim 1, wherein said electronic device is selected from the group consisting of: a computer, an electronic toy, a PDA, an organizer, a speaker, a set-top box of a cable TV system, a cellular telephone, a laptop computer, and a touch screen pen.

22. A method according to claim 1, wherein said analyzing includes analyzing said acoustic signals, automatically by a device selected from the group consisting of: a printer, a satellite telephone, a set-top box of a cable TV system, an electronic toy, a touch screen pen.

23. System for determining a status of an electronic device, comprising:
- an electronic device including a microphone and a speaker, said electronic device configured for transmitting information-encoding acoustic signals;
  - a computer including a sound card connected to at least one microphone and at least one speaker; and
  - whereby said computer is configured for receiving said information-encoding acoustic signals, for decoding said acoustic signals, and for processing said signals to determining a status associated with said electronic device responsive to said information, wherein said status is indicative of a characteristic of said electronic device, said status encoded in said acoustic signals.

* * * * *